(12) United States Patent
Du et al.

(10) Patent No.: US 12,540,828 B2
(45) Date of Patent: Feb. 3, 2026

(54) ROUTE PLOTTING METHOD AND APPARATUS, COMPUTER DEVICE, STORAGE MEDIUM AND PROGRAM PRODUCT

(71) Applicant: TENCENT TECHNOLOGY (SHENZHEN) COMPANY LIMITED, Shenzhen (CN)

(72) Inventors: Tian Du, Shenzhen (CN); Hui Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 223 days.

(21) Appl. No.: 18/235,179

(22) Filed: Aug. 17, 2023

(65) Prior Publication Data

US 2023/0392945 A1 Dec. 7, 2023

Related U.S. Application Data

(63) Continuation of application No. PCT/CN2022/132978, filed on Nov. 18, 2022.

(30) Foreign Application Priority Data

Jan. 21, 2022 (CN) .......................... 202210070269.1

(51) Int. Cl.
*G01C 21/36* (2006.01)

(52) U.S. Cl.
CPC ....... *G01C 21/3676* (2013.01); *G01C 21/367* (2013.01)

(58) Field of Classification Search
CPC .. G01C 21/3676; G01C 21/367; G01C 21/34; G06T 17/05; G06T 7/75
See application file for complete search history.

(56) References Cited

U.S. PATENT DOCUMENTS

2019/0331500 A1* 10/2019 Long ........................ G06F 16/29

FOREIGN PATENT DOCUMENTS

| CN | 106643732 A | 5/2017 | |
| CN | 107464430 A * | 12/2017 | ............... G08G 1/07 |

(Continued)

OTHER PUBLICATIONS

Machine Translation of CN 107464430 A (Year: 2017).*

(Continued)

*Primary Examiner* — Brandon D Lee
(74) *Attorney, Agent, or Firm* — Anova Law Group, PLLC

(57) ABSTRACT

A route plotting method includes: displaying an electronic map; determining multiple position points in the electronic map, where longitude coordinates of the multiple position points fall within a first longitude coordinate range; converting a project longitude coordinate to a target longitude coordinate range in response to that the multiple position points meet a conversion condition; where the conversion condition includes: an absolute value of a difference between longitude coordinates of adjacent position points is greater than a first value, the first value being a maximum value within the first longitude coordinate range; and the project longitude coordinate is a longitude coordinate in the longitude coordinates of the multiple position points that does not fall within the target longitude coordinate range; and plotting, in order of converted longitude coordinates, a route formed by connecting the multiple position points in the electronic map.

17 Claims, 18 Drawing Sheets

(56) References Cited

FOREIGN PATENT DOCUMENTS

| | | |
|---|---|---|
| CN | 110849376 A | 2/2020 |
| CN | 112651106 A | 4/2021 |
| CN | 113505164 A | 10/2021 |
| CN | 114419269 A | 4/2022 |
| WO | 2018201994 A1 | 11/2018 |

OTHER PUBLICATIONS

The World Intellectual Property Organization (WIPO) International Search Report for PCT/CN2022/132978 Jan. 28, 2023 12 Pages (including translation).

* cited by examiner

ROUTE PLOTTING METHOD AND APPARATUS, COMPUTER DEVICE, STORAGE MEDIUM AND PROGRAM PRODUCT

RELATED APPLICATIONS

This application is a continuation application of PCT Patent Application No. PCT/CN2022/132978 filed on Nov. 18, 2002, which claims priority to Chinese Patent Application No. 202210070269.1, entitled "ROUTE PLOTTING METHOD AND APPARATUS, COMPUTING DEVICE AND STORAGE MEDIUM" filed on Jan. 21, 2022, all of which are incorporated by reference in entirety.

FIELD OF THE TECHNOLOGY

The present disclosure relates to the field of maps, and in particular relates to a route plotting method and apparatus, a computing device, a storage medium and a program product.

BACKGROUND

If the earth is regarded as a sphere, a great circle arc line between any two points on the ground is the shortest route between the two points on the ground. With the development of computer technologies and the widespread implementation of electronic maps, it may be desirable to plot a route between two points in the electronic map. A suitable route plotting method is desirable.

SUMMARY

Embodiments of the present disclosure provide a route plotting method and apparatus, a computing device, a storage medium and a program product. The technical solutions are as follows:

In one aspect, a route plotting method is provided. The method is executed by a computing device, and the method includes:

determining multiple position points in an electronic map, the electronic map having a first longitude coordinate range and a target longitude coordinate range, and longitude coordinates of the multiple position points falling within the first longitude coordinate range;

converting a project longitude coordinate to the target longitude coordinate range in response to that the multiple position points meet a conversion condition, the conversion condition including: an absolute value of a difference between longitude coordinates of adjacent position points is greater than a first value, the first value being a maximum value within the first longitude coordinate range; and the project longitude coordinate is a longitude coordinate in the longitude coordinates of the multiple position points that does not fall within the target longitude coordinate range; and plotting, in order of converted longitude coordinates, a route formed by connecting the multiple position points in the electronic map.

In certain embodiment(s), the project longitude coordinate is a specified longitude coordinate.

In certain embodiment(s), the operation of determining coordinates of at least one first way point between a starting point and an end point according to coordinates of the starting point and coordinates of the end point is executed by a central processing unit, and the operation of determining, from the starting point, the end point and the at least one first way point, coordinates of at least one second way point between every two adjacent position points in parallel according to coordinates of every two adjacent position points is executed by a graphics processing unit.

In certain embodiment(s), the method further includes:

storing, by the central processing unit, the coordinates of the starting point, the coordinates of the end point and the coordinates of the at least one first way point in an internal memory buffer space; and acquiring, by the graphics processing unit, the coordinates of the starting point, the coordinates of the end point and the coordinates of the at least one first way point in the internal memory buffer space.

In certain embodiment(s), determining the target longitude coordinate difference includes:

determining a first ratio between the target longitude coordinate difference and the maximum longitude coordinate difference, and a second ratio between the target latitude coordinate difference and the maximum latitude coordinate difference; and determining, based on the first ratio and the second ratio, the target quantity, where the target quantity is positively correlated with the maximum value of the first ratio and the second ratio.

In another aspect, a route plotting apparatus is provided. The apparatus includes: a memory storing computer program instructions; and a processor coupled to the memory and configured to execute the computer program instructions and perform: determining multiple position points in an electronic map, the electronic map including a first longitude coordinate range and a target longitude coordinate range, and longitude coordinates of the multiple position points falling within the first longitude coordinate range; converting a project longitude coordinate to the target longitude coordinate range in response to that the multiple position points meet a conversion condition, the conversion condition including: an absolute value of a difference between longitude coordinates of adjacent position points is greater than a first value, the first value being a maximum value within the first longitude coordinate range; and the project longitude coordinate is a longitude coordinate in the longitude coordinates of the multiple position points that does not fall within the target longitude coordinate range; and plotting, in order of converted longitude coordinates, a route formed by connecting the multiple position points in the electronic map.

In another aspect, a computing device is provided. The computing device includes a processor and a memory, where the memory stores at least one computer program, and the at least one computer program is loaded and executed by the processor to implement operations performed by the route plotting method as described herein.

In another aspect, a non-transitory computer-readable storage medium is provided. The computer-readable storage medium stores at least one computer program, and the at least one computer program is loaded and executed by a processor to implement operations performed by the route plotting method as described herein.

In response to that the absolute value of the difference between the longitude coordinates of adjacent position points is greater than the maximum value of the first longitude coordinate range, it indicates that these two adjacent position points are located at two sides of a longitude line where the minimum longitude coordinate and the maximum longitude coordinate are located, respectively, and if plotting is performed directly according to the longitude coordinates, there will be a problem that a plotted route has an error. In order to plot a correct route, in the solutions provided by various embodiments of the present disclosure, the project longitude coordinate in the multiple position points is converted to the target longitude coordinate range, so that the longitude coordinates of the multiple position points all fall within the target longitude coordinate range, so as to change longitude coordinates corresponding to a longitude line that a route between these two position points crosses. At this time, plotting is performed according to the converted longitude coordinates, and thus, the shortest route formed by connecting the multiple position points may be plotted, and the accuracy of route plotting is improved.

Other aspects of the present disclosure may be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of embodiments. When and as applicable, the term "an embodiment," "one embodiment," "some embodiment(s), "some embodiments," "certain embodiment(s)," or "certain embodiments" may refer to the same subset or different subsets of embodiments, and may be combined with each other without conflict.

In certain embodiments, the term "based on" is employed herein interchangeably with the term "according to."

For ease of understanding of embodiments of the present disclosure, concepts involved are firstly explained as follows:

1. Great circle arc line: the great circle arc line, also referred to as a great circle course line or a geodetic curve, is the shortest route between any two points on the ground and is also a geographical route with the shortest geographical distance adopted during navigation. The great circle arc line is composed of an intersection line of a plane composed of two points and the core of the earth that is tangent to the curved surface of the earth. If the earth is regarded as a circular sphere, the shortest distance between two points on the ground is a great circle arc line less than 180° connecting the two points.

Figure 1:
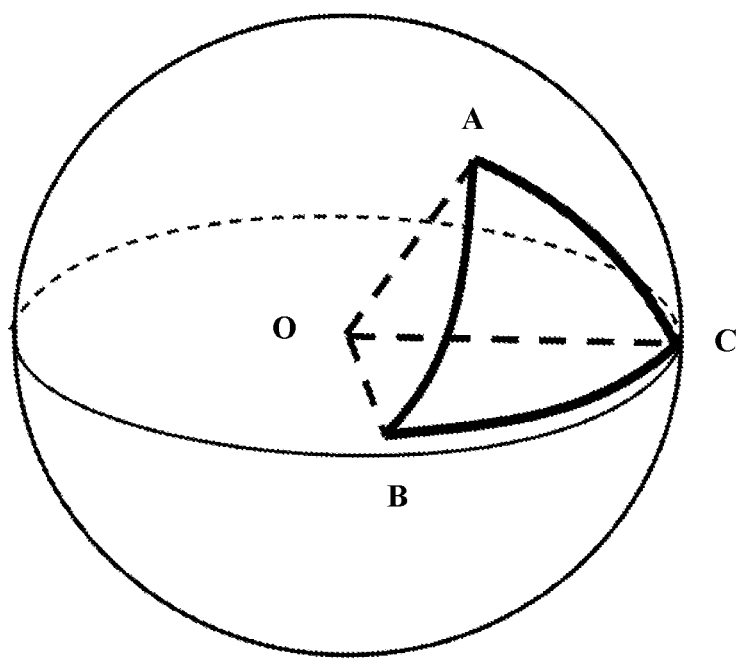
FIG. 1 is a schematic diagram of a great circle arc line according to certain embodiment(s) of the present disclosure.

FIG. 1 is a schematic diagram of a great circle arc line provided by an embodiment of the present disclosure. As shown in FIG. 1, a curve AB is the shortest circle arc between a point A and a point B on a spherical surface, i.e., a great circle arc line between the point A and the point B. The great circle arc line is formed by an intersection line of a plane composed of a point O, the point A and the point B that is tangent to the curved surface of the earth. A curve AC is the shortest circular arc between the point A and a point C on the spherical surface, i.e., a great circle arc line between the point A and the point C. The great circle arc line is formed by an intersection line of a plane composed of the point O, the point A and the point C that is tangent to the curved surface of the earth.

2. JavaScript API GL (a rendering engine): a web graphics library (WebGL)-based web side rendering engine of a map, may provide 3-dimension (3D) versions of web developers to directly call base map data of the map, and may provide advanced visualization graphics capabilities such as points, lines, planes and personalized graphics layers.

3. WebGL: a technology used for plotting and rendering 3D graphics on a web, and allowing users to interact therewith, an underlying OpenGL Shading Language (GLSL) of which may be directly used for performing operations and arithmetic operations on a graphics processing unit (GPU).

4. Vertex shader: a program used for describing vertex characteristics (such as positions, and colors). A vertex refers to a point in a 2D or 3D space, such as an end point or an intersection point of a 2D or 3D graphic.

5. Fragment shader: a program used for processing data such as colors or light fragment by fragment. The GPU may process multiple fragments in parallel, and one fragment may also be understood as one pixel unit.

Figure 2:
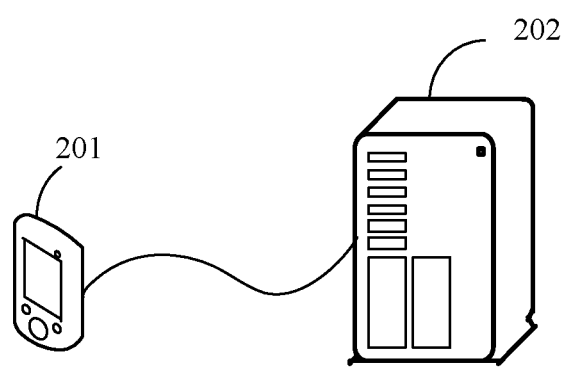
FIG. 2 is a schematic diagram of an implementation environment according to certain embodiment(s) of the present disclosure.

FIG. 2 is a schematic diagram of an implementation environment provided by an embodiment of the present disclosure. Referring to FIG. 2, the implementation environment includes: a terminal 201 and a server 202. The terminal 201 and the server 202 may be directly or indirectly connected via wired or wireless communication. The server 202 is configured to provide an electronic map to the terminal 201, and the terminal 201 is configured to plot a route formed by connecting multiple position points in the electronic map.

In one embodiment, a target application serviced by the server 202 is installed on the terminal 201. The terminal 201 may implement, by the target application, functions such as displaying the electronic map and plotting navigation routes. In certain embodiment(s), the target application is a target application in an operating system of the terminal 201, or a target application provided by a third party. For example, the target application is an electronic map application, and the like. In certain embodiment(s), the server 202 is a background server of the target application or a cloud server that provides services such as cloud computing and cloud storage.

In one embodiment, the terminal 201 may be a smartphone, a tablet computer, a laptop, a desktop computer, a smart speaker, a smart voice interaction device, a smartwatch, a car-mounted terminal, and the like, but is not limited thereto. The server 202 may be an independent physical server, or a server cluster or distributed system composed of multiple physical servers, and may also be a cloud server that provides cloud services, cloud databases, cloud computing, cloud functions, cloud storage, network services, cloud communications, middleware services, domain name services, security services, content delivery networks (CDN), and cloud computing services such as big data and artificial intelligence platforms.

Figure 3:
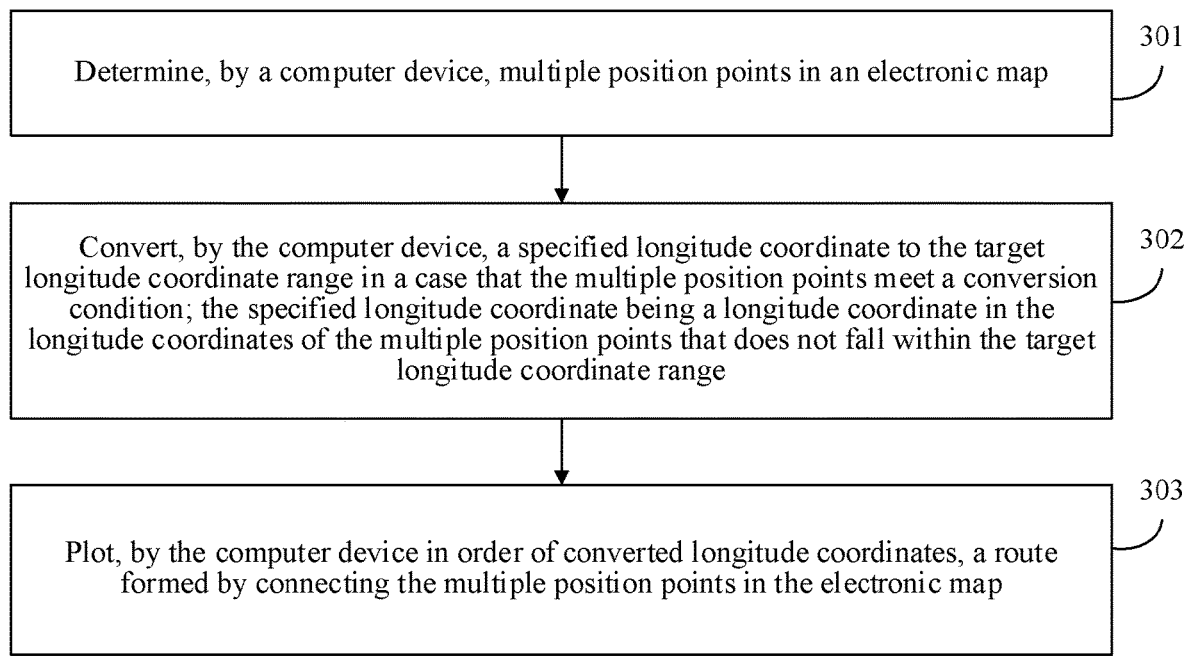
FIG. 3 is a schematic flowchart of a route plotting method according to certain embodiment(s) of the present disclosure.

FIG. 3 is a flowchart of a route plotting method provided by an embodiment of the present disclosure. An executive subject of this embodiment of the present disclosure is a computing device. Referring to FIG. 3, the method includes:

301: Determine, by the computing device, multiple position points in an electronic map.

The electronic map is a map stored digitally by using a computer technology. The electronic map has a first longitude coordinate range and a target longitude coordinate range, and the first longitude coordinate range and the target longitude coordinate range are determined in different longitude coordinate systems. Therefore, although both the first longitude coordinate range and the target longitude coordinate range are used for representing geographical regions in the electronic map, the first longitude coordinate range and the target longitude coordinate range are not the same.

The electronic map includes various position points in any one or more geographical regions therein. Since the electronic map has the first longitude coordinate range and the target longitude coordinate range, longitude coordinates in the first longitude coordinate range may be used for describing the position points in the electronic map, or longitude coordinates in the target longitude coordinate range may be used for describing the position points in the electronic map.

In this embodiment of the present disclosure, the computing device determines the multiple position points in the electronic map, and longitude coordinates of these multiple position points fall within the first longitude coordinate range.

302: Convert, by the computing device, a project longitude coordinate to the target longitude coordinate range in response to that the multiple position points meet a conversion condition; the project longitude coordinate being a longitude coordinate in the longitude coordinates of the multiple position points that does not fall within the target longitude coordinate range.

In certain embodiment(s), the project longitude coordinate is a specified longitude coordinate.

The conversion condition includes: an absolute value of a difference between longitude coordinates of adjacent position points is greater than a first value, and the first value is a maximum value, i.e., a maximum longitude coordinate, within the first longitude coordinate range. Since the electronic map is used for describing regions on the earth, and the earth is a sphere, a longitude line where the minimum longitude coordinate in the electronic map is located coincides with a longitude line where the maximum longitude coordinate is located. If the absolute value of the difference between the longitude coordinates of adjacent position points is greater than the first value, it indicates that these two adjacent position points are located at two sides of the longitude line where the minimum longitude coordinate and the maximum longitude coordinate are located respectively, and the shortest route between these two position points is to be a curve that crosses the longitude line where the minimum longitude coordinate and the maximum longitude coordinate are located.

However, since plotting may be performed in order of the longitude coordinates when plotting curves in the electronic map, a curve that crosses the longitude line where the minimum longitude coordinate and the maximum longitude coordinate are located will not be obtained. As a result, a plotted route is wrong. Therefore, in such a scenario, the computing device converts the project longitude coordinate in the multiple position points to the target longitude coordinate range, so as to change the longitude coordinates corresponding to the longitude line that the route between these two position points crosses.

Since the electronic map has multiple longitude coordinate ranges, and one position point may be described by longitude coordinates within different longitude coordinate ranges, conversion of the longitude coordinates referred to in the embodiments of the present disclosure refers to converting longitude coordinates used for describing a certain position point within one longitude coordinate range to longitude coordinates also used for describing the position point within another longitude coordinate range.

303: Plot, by the computing device in order of converted longitude coordinates, a route formed by connecting the multiple position points in the electronic map.

Since the computing device has converted the project longitude coordinate to the target longitude coordinate range, the longitude coordinates corresponding to the longitude line that the route between these two position points crosses are changed. At this time, a correct shortest route may be plotted in the electronic map in order of the converted longitude coordinates.

According to the method provided by the embodiments of the present disclosure, in response to that the absolute value of the difference between the longitude coordinates of adjacent position points is greater than the maximum value of the first longitude coordinate range, it indicates that these two adjacent position points are located at two sides of the longitude line where the minimum longitude coordinate and the maximum longitude coordinate are located, respectively, and if plotting is performed directly according to the longitude coordinates, there will be a problem that the plotted route has an error. Therefore, in order to plot a correct route, the project longitude coordinate is converted to the target longitude coordinate range, so that the longitude coordinates of the multiple position points all fall within the target longitude coordinate range, so as to change the longitude coordinates corresponding to the longitude line that the route between these two position points crosses. At this time, plotting is performed according to the converted longitude coordinates, and thus, the shortest route formed by connecting the multiple position points may be plotted, and the accuracy of route plotting is improved.

Figure 4:
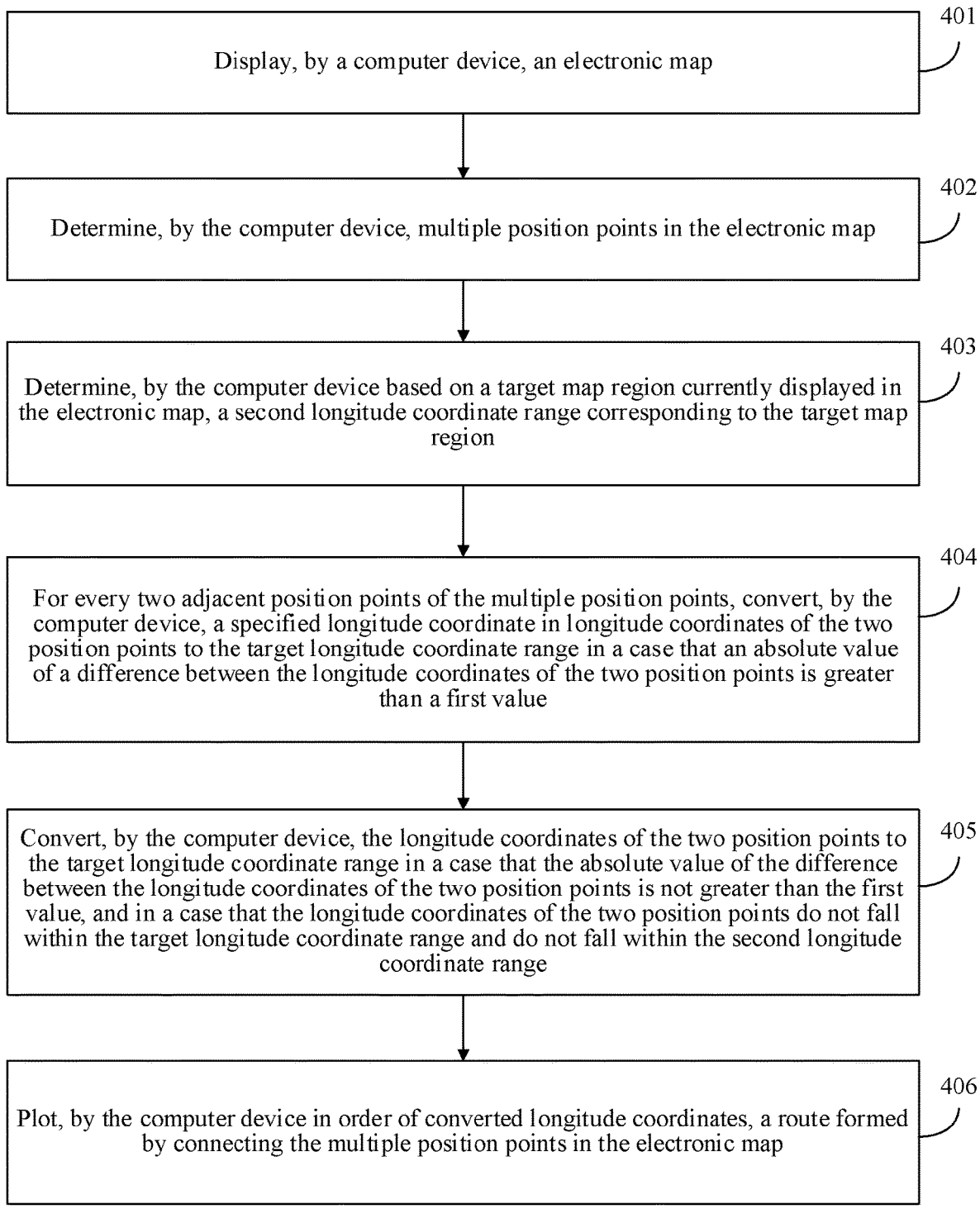
FIG. 4 is a schematic flowchart of another route plotting method according to certain embodiment(s) of the present disclosure.

FIG. 4 is a flowchart of another route plotting method provided by an embodiment of the present disclosure. An executive subject of this embodiment of the present disclosure is a computing device. Referring to FIG. 4, the method includes:

401: Display, by the computing device, an electronic map.

In this embodiment of the present disclosure, the electronic map has multiple longitude coordinate ranges. The multiple longitude coordinate ranges are determined in different longitude coordinate systems. Therefore, although the multiple longitude coordinate ranges are all used for representing geographical regions in the electronic map, the multiple longitude coordinate ranges are not the same.

402: Determine, by the computing device, multiple position points in the electronic map.

The multiple position points include a starting point, an end point and way points between the starting point and the end point. The computing device acquires longitude coordinates of the multiple position points. The longitude coordinates of the multiple position points fall within the first longitude coordinate range of the multiple longitude coordinate ranges. The first longitude coordinate range includes positive and negative numbers. In this embodiment of the present disclosure, it is illustrated by taking the first longitude coordinate range being a longitude coordinate range from −180° to 180°. In other embodiments, the first longitude coordinate range may also be other longitude coordinate ranges, which will not be limited by the embodiments of the present disclosure.

403: Determine, by the computing device based on a target map region currently displayed in the electronic map, a second longitude coordinate range corresponding to the target map region.

When the computing device displays the electronic map, the perform electronic map may be displayed or only a portion of a region in the electronic map may be displayed. Therefore, the computing device determines, from the electronic map, the target map region currently displayed. The computing device determines the second longitude coordinate range corresponding to the target map region currently displayed. The second longitude coordinate range is used for describing the target map region. Longitude coordinates within the second longitude coordinate range increase in sequence. That is, the longitude coordinates in the second longitude coordinate range are determined in order of increasing in sequence, and the same longitude line does not correspond to different longitude coordinates.

For example, the second longitude coordinate range is "−45° to 0° to 45°" or "160° to 180° to 200°" instead of "160° to 180°/−180° to −160°".

404: For every two adjacent position points of the multiple position points, convert, by the computing device, a project longitude coordinate in longitude coordinates of the two position points to the target longitude coordinate range in response to that an absolute value of a difference between the longitude coordinates of the two position points is greater than a first value.

The computing device traverses every two adjacent position points of the multiple position points in sequence. For the two adjacent position points currently traversed, the computing device determines the absolute value of the difference between the longitude coordinates of these two position points. If the absolute value is greater than the first value, that is, the absolute value is greater than a maximum value within the first longitude coordinate range, as mentioned in step 302, a curve obtained by plotting directly based on the longitude coordinates of these two position points will have an error. Therefore, the computing device determines a longitude coordinate in the longitude coordinates of the two position points that does not fall within the target longitude coordinate range, and converts the longitude coordinate that does not fall within the target longitude coordinate range to the target longitude coordinate range, so that the longitude coordinates of these two position points both fall within the target longitude coordinate range.

In one embodiment, the first longitude coordinate range includes a first sub-range and a second sub-range, and the target longitude coordinate range includes the second sub-range and a third sub-range. The first longitude coordinate range and the second longitude coordinate range include the coincident second sub-range. The longitude coordinates of the multiple position points fall within the first longitude coordinate range. Therefore, longitude coordinates in the longitude coordinates of the multiple position points that do not fall within the second sub-range are coordinates that do not fall within the target longitude coordinate range. That is, longitude coordinates that fall within the first sub-range are converted to the third sub-range in the target longitude coordinate range. Converting the longitude coordinate in the longitude coordinates of the two position points that does not fall within the target longitude coordinate range to the target longitude coordinate range includes the following two scenarios:

(1) In response to that a maximum value in the third sub-range is greater than a maximum value in the first sub-range, the computing device adds a second value to the longitude coordinate in the longitude coordinates of the multiple position points that does not fall within the second sub-range.

If the maximum value in the third sub-range is greater than the maximum value in the first sub-range, it indicates that the longitude coordinate in the third sub-range corresponding to the same position point is greater than the longitude coordinate in the first sub-range corresponding to the position point. Therefore, to convert the longitude coordinates falling within the first sub-range to the third sub-range, a value may be added.

The second value is the absolute value of the difference between the maximum value in the third sub-range and the maximum value in the first sub-range. That is, the longitude coordinate in the third sub-range corresponding to the same position point is greater than the longitude coordinate in the first sub-range corresponding to the position point by the second value. Therefore, the second value is added to the longitude coordinates falling within the first sub-range, and thus, the longitude coordinates converted to the target longitude coordinate range may be obtained.

(2) In response to that the maximum value in the third sub-range is less than the maximum value in the first sub-range, the computing device subtracts the second value from the longitude coordinate in the longitude coordinates of the multiple position points that does not fall within the second sub-range.

If the maximum value in the third sub-range is less than the maximum value in the first sub-range, it indicates that the longitude coordinate in the third sub-range corresponding to the same position point is less than the longitude coordinate in the first sub-range corresponding to the position point. Therefore, to convert the longitude coordinates falling within the first sub-range to the third sub-range, a value may be subtracted.

The second value is the absolute value of the difference between the maximum value in the third sub-range and the maximum value in the first sub-range. That is, the longitude coordinate in the third sub-range corresponding to the same position point is less than the longitude coordinate in the first sub-range corresponding to the position point by the second value. Therefore, the second value is subtracted from the longitude coordinates falling within the first sub-range, and thus, the longitude coordinates converted to the target longitude coordinate range may be obtained.

405: Convert, by the computing device, the longitude coordinates of the two position points to the target longitude coordinate range in response to that the absolute value of the difference between the longitude coordinates of the two position points is not greater than the first value, and in response to that the longitude coordinates of the two position points do not fall within the target longitude coordinate range and do not fall within the second longitude coordinate range.

In response to that the absolute value of the difference between the longitude coordinates of the two position points is not greater than the first value, the shortest route between these two position points is a curve that will not cross the longitude line where the minimum longitude coordinate and the maximum longitude coordinate are located. The computing device determines whether the longitude coordinates of these two position points fall within the target longitude coordinate range or not, and whether the longitude coordinates of these two position points fall within the second longitude coordinate range or not.

If the longitude coordinates of the two position points do not fall within the target longitude coordinate range and do not fall within the second longitude coordinate range, it indicates that these two position points are at the same side as the position points with the longitude coordinates converted in step 404, and if the longitude coordinates of these two position points are still kept unchanged, an error will occur when plotting a curve that connects these two position points with the position points with the longitude coordinates converted in step 404. Therefore, the computing device also converts the longitude coordinates of these two position points to the target longitude coordinate range.

If the longitude coordinates of the two position points do not fall within the target longitude coordinate range, but fall within the second longitude coordinate range, and in response to that the longitude coordinates of the two position points are converted to the target longitude coordinate range, the longitude coordinates of the two position points will not fall within the second longitude coordinate range, thereby influencing a route that connects these two position points with other position points falling within the second longitude coordinate range. Therefore, in such a scenario, the computing device may not execute the step of converting the longitude coordinates of the two position points to the target longitude coordinate range.

If the longitude coordinates of the two position points fall within the target longitude coordinate range, the computing device may not execute the step of converting the longitude coordinates of the two position points to the target longitude coordinate range.

In one embodiment, the first longitude coordinate range includes the first sub-range and the second sub-range, and the target longitude coordinate range includes the second sub-range and the third sub-range. Converting the longitude coordinates of the two position points to the target longitude coordinate range includes the following two scenarios:

(1) In response to that the maximum value in the third sub-range is greater than the maximum value in the first sub-range, and in response to that the longitude coordinates of the two position points do not fall within the second sub-range and do not fall within the second longitude coordinate range, the second value is added to the longitude coordinates of these two position points.

(2) In response to that the maximum value in the third sub-range is less than the maximum value in the first sub-range, and in response to that the longitude coordinates of the two position points do not fall within the second sub-range and do not fall within the second longitude coordinate range, the second value is subtracted from the longitude coordinates of these two position points.

The second value is the absolute value of the difference between the maximum value in the third sub-range and the maximum value in the first sub-range. This step is similar to step 404 in terms of the manner to convert the longitude coordinates, which will not be repeated here.

In this embodiment of the present disclosure, by executing steps 404 to 405, the project longitude coordinate may be converted to the target longitude coordinate range in response to that the multiple position points meet the conversion condition.

406: Plot, by the computing device in order of converted longitude coordinates, a route formed by connecting the multiple position points in the electronic map.

Since the computing device has already converted the project longitude coordinate to the target longitude coordinate range, the longitude coordinates corresponding to the longitude line that the route between these two position points crosses are changed. Therefore, the correct shortest route may be plotted in the electronic map in order of the converted longitude coordinates.

In one embodiment, the computing device plots the curve formed by connecting the multiple position points in the electronic map in order of the converted longitude coordinates from large to small or in order of the converted longitude coordinates from small to large, so as to obtain a route between the starting point and the end point.

Figure 5:
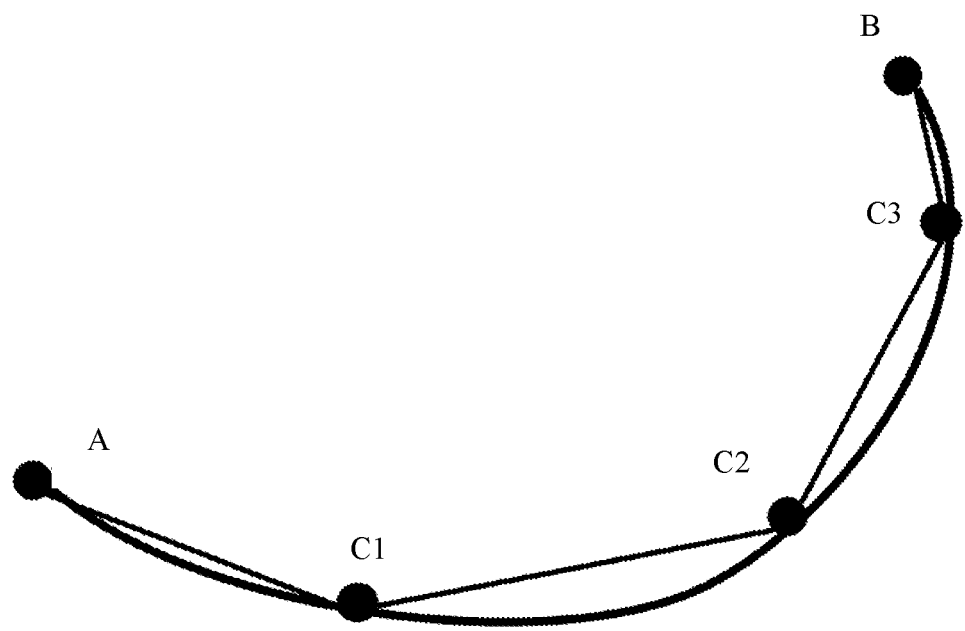
FIG. 5 is a schematic diagram of a route according to certain embodiment(s) of the present disclosure.

FIG. 5 is a schematic diagram of a route provided by an embodiment of the present disclosure. As shown in FIG. 5, the starting point is a point A, the end point is a point B, and there are multiple way points between the point A and the point B. The multiple way points are a point C1, a point C2 and a point C3. The computing device connects two adjacent position points in sequence in order of the converted longitude coordinates to obtain a broken line segment between the two position points, and a route between the point A and the point B is essentially formed by splicing the broken line segments between every two position points.

In one embodiment, the computing device includes a graphics processing unit. The graphics processing unit includes a vertex shader and a fragment shader. The computing device acquires coordinates of the multiple position points by the vertex shader, where the coordinates of the position points include longitude coordinates and latitude coordinates. The longitude coordinates of the position points are converted by the vertex shader, and the converted longitude coordinates and latitude coordinates are inputted into the fragment shader. Data among the multiple position points is rasterized by the fragment shader according to the longitude coordinates and the latitude coordinates to perform pixel-level curve rendering, thereby the route between the starting point and the end point is plotted in the electronic map, and the visualization effect of the route is achieved.

According to the method provided by the embodiments of the present disclosure, in response to that the absolute value of the difference between the longitude coordinates of adjacent position points is greater than the maximum value of the first longitude coordinate range, it indicates that these two adjacent position points are located at two sides of the longitude line where the minimum longitude coordinate and the maximum longitude coordinate are located, respectively, and if plotting is performed directly according to the longitude coordinates, there will be a problem that the plotted route has an error. Therefore, in order to plot a correct route, the project longitude coordinate is converted to the target longitude coordinate range, so that the longitude coordinates of the multiple position points all fall within the target longitude coordinate range, so as to change the longitude coordinates corresponding to the longitude line that the route between these two position points crosses. At this time, plotting is performed according to the converted longitude coordinates, and thus, the shortest route formed by connecting the multiple position points may be plotted, and the accuracy of route plotting is improved.

Moreover, there is the coincident second sub-range between the first longitude coordinate range and the target longitude coordinate range, and the first sub-range in the first longitude coordinate range does not coincide with the second sub-range in the target longitude coordinate range. Therefore, the longitude coordinates falling within the first sub-range are converted to the second range by adding or subtracting the second value, thereby providing a manner of longitude coordinate conversion, so that it may be guaranteed that the longitude coordinate before conversion and the converted longitude coordinate indicate the same position, that is, the accuracy of longitude coordinate conversion is guaranteed.

Moreover, if the longitude coordinates of the two position points do not fall within the target longitude coordinate range and do not fall within the second longitude coordinate range, it indicates that these two position points are at the same side as the position points with the converted longitude coordinates, the longitude coordinates of these two position points are also converted to the target longitude coordinate range, and thereby, it is guaranteed that there is no error when plotting the route that connects these two position points with the position points with the converted longitude coordinates, and the accuracy of route plotting is further improved.

Moreover, in this embodiment of the present disclosure, the correct route may be plotted by converting the longitude coordinate of at least one of the multiple position points. Since the processing manner is relatively simple, no much processing resources will be wasted, and the efficiency of route plotting may also be guaranteed.

In another route plotting method provided by the embodiments of the present disclosure, the first longitude coordinate range includes positive numbers and negative numbers, and the target longitude coordinate range does not include positive numbers or does not include negative numbers.

Since the first longitude coordinate range includes the positive numbers and the negative numbers, the minimum longitude coordinate is a negative number and the maximum longitude coordinate is a positive number. Therefore, the positive numbers are located at one side of the longitude line where the minimum longitude coordinate and the maximum longitude coordinate are located, and the negative numbers are located at the other side thereof. If the absolute value of the difference between the longitude coordinates of adjacent position points is greater than the first value, it indicates that these two adjacent position points are located at two sides of the longitude line where the minimum longitude coordinate and the maximum longitude coordinate are located, respectively. The longitude coordinate of one position point is a positive number, while the longitude coordinate of the other position point is a negative number, and the shortest route between these two position points is to be a curve that crosses the longitude line where the minimum longitude coordinate and the maximum longitude coordinate are located, rather than a curve that crosses the 0° longitude line. However, since plotting may be performed in order of the longitude coordinates when plotting curves in the electronic map, and the longitude coordinate of one of two adjacent position points is a positive number, and the longitude coordinate of the other position point is a negative number, the curve that crosses the 0° longitude line will be obtained during plotting, instead of a curve that crosses the longitude line where the minimum longitude coordinate and the maximum longitude coordinate are located. As a result, the shortest route plotted is wrong.

Therefore, in such a scenario, the computing device converts the project longitude coordinate to the target longitude coordinate range by using the method provided by the embodiments of the present disclosure. Since the target longitude coordinate range does not include the positive numbers or the negative numbers, there is no case that one of the converted longitude coordinates is a positive number and the other converted longitude coordinate is a negative number. At this time, the correct shortest route may be plotted by plotting according to the converted longitude coordinates, and the accuracy of route plotting is improved.

For example, the first longitude coordinate range is a longitude coordinate range from −180° to 180°, the target longitude coordinate range is a longitude coordinate range from 0° to 360°, or the target longitude coordinate range is a longitude coordinate range from −360° to 0° or the like. Since the first longitude coordinate range includes the positive numbers and the negative numbers, the minimum longitude coordinate is a negative number and the maximum longitude coordinate is a positive number. Therefore, the positive numbers are located at one side of the longitude line where the minimum longitude coordinate and the maximum longitude coordinate are located, and the negative numbers are located at the other side thereof.

Figure 6:
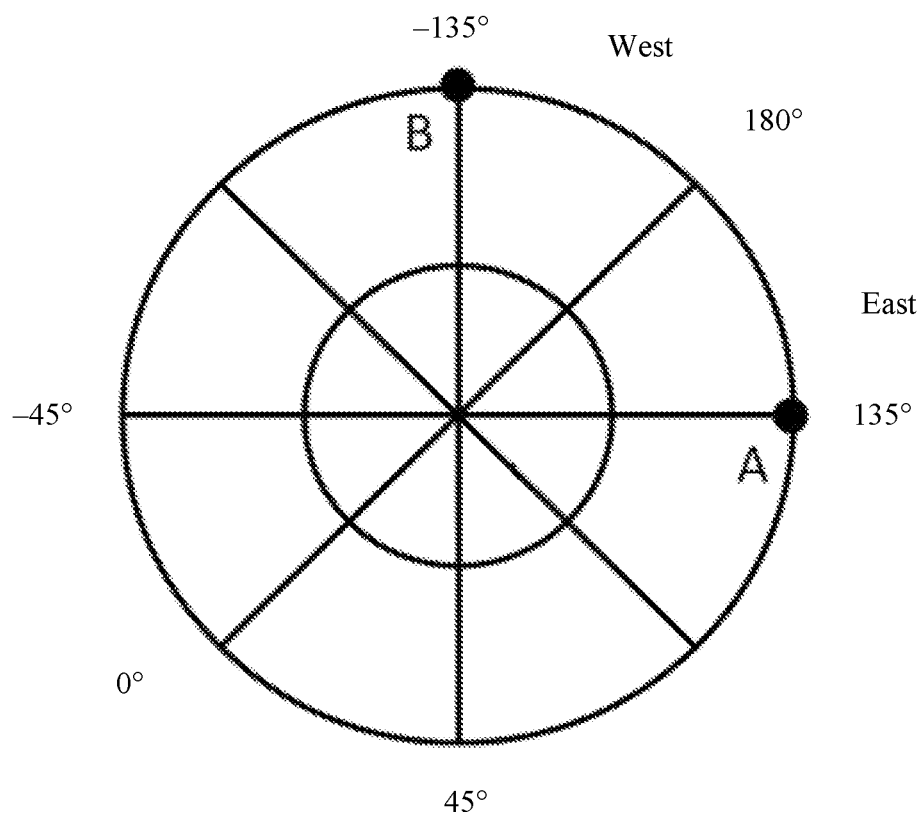
FIG. 6 is a schematic diagram of an electronic map according to certain embodiment(s) of the present disclosure.
Figure 7:
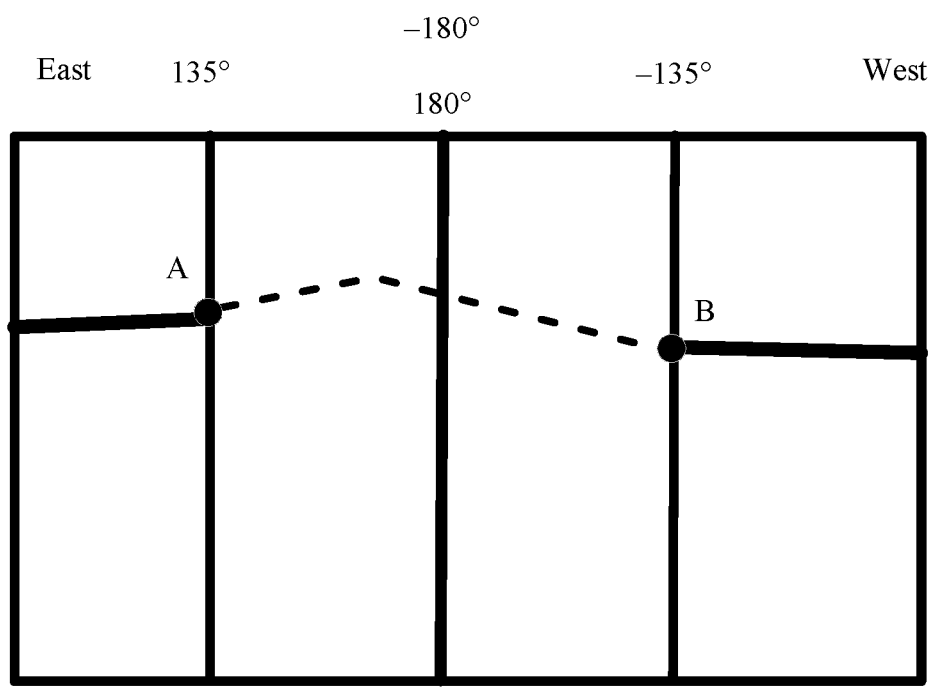
FIG. 7 is a schematic diagram of another electronic map according to certain embodiment(s) of the present disclosure.

Taking the first longitude coordinate range being the longitude coordinate range from −180° to 180° as an example, referring to the electronic maps as shown in FIG. 6 and FIG. 7, longitude coordinates of the west longitude are negative numbers, and longitude coordinates of the east longitude are positive numbers. The −180° longitude line coincides with the 180° longitude line, and the positive numbers are located at one side of the 180° longitude line, and the negative numbers are located at the other side thereof. If the absolute value of the difference between the longitude coordinates of two adjacent position points is greater than 180°, it indicates that one of the longitude coordinates of these two position points is the positive number and the other longitude coordinate is the negative number, and these two position points are closer to the 180° longitude line rather than the 0° longitude line. As shown in FIG. 6 and FIG. 7, taking the longitude of a point A being 135° and the longitude of a point B being −135° as an example, the shortest route between the point A and the point B is to be a curve that crosses the 180° longitude line. While in the actual plotting process, if the curve between two position points is plotted directly in order of the longitude coordinates, a curve that crosses the 0° longitude line will be obtained. However, from FIG. 6 and FIG. 7, it may be seen that the shortest route between the point A and the point B is to be the curve that crosses the 180° longitude line. Therefore, direct plotting may result in an error. If −135° is converted to a positive number or 135° is converted to a negative number according to the method provided by the embodiments of the present disclosure, the curve that crosses the 180° longitude line may be plotted.

Figure 8:
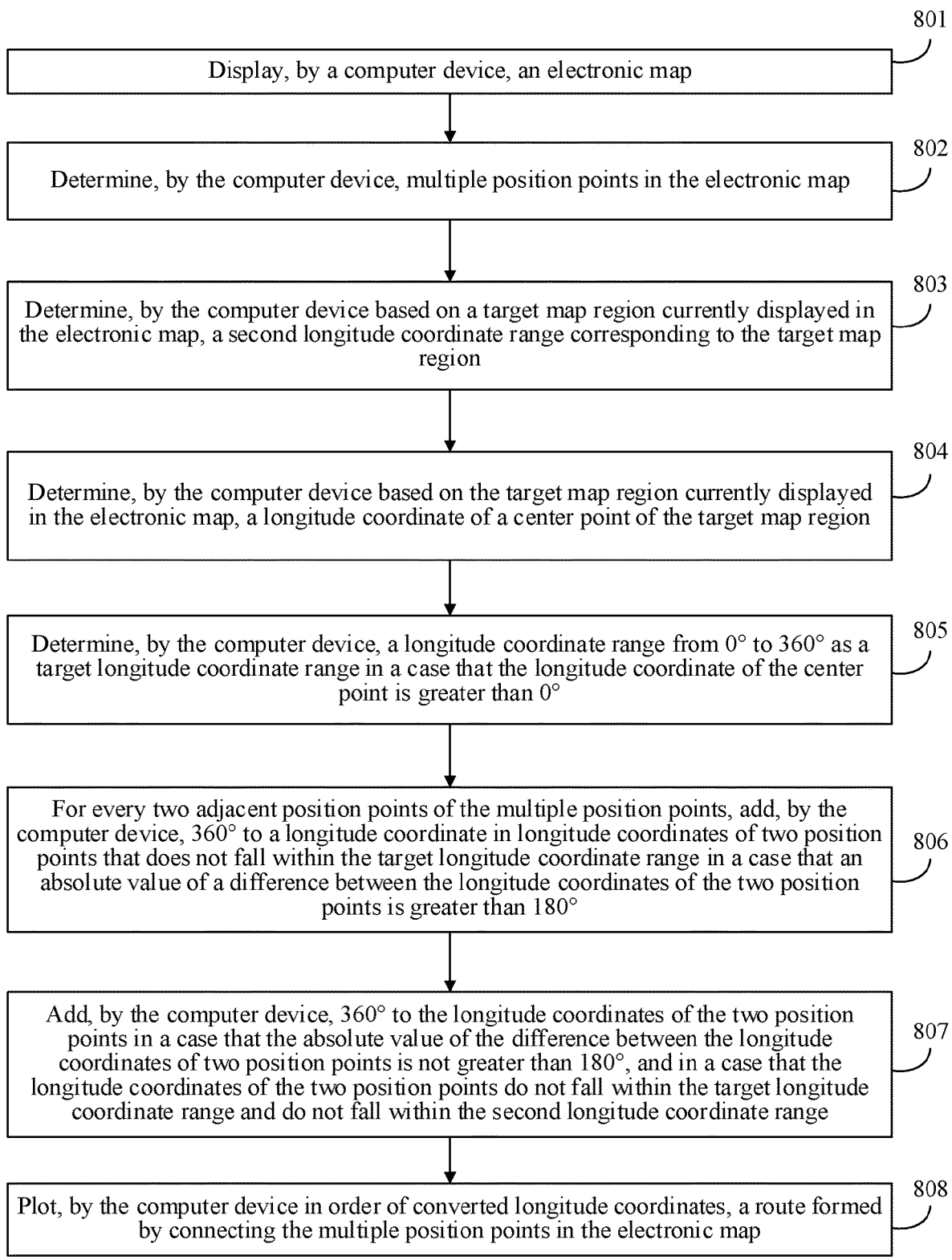
FIG. 8 is a schematic flowchart of another route plotting method according to certain embodiment(s) of the present disclosure.

FIG. 8 is a flowchart of another route plotting method provided by an embodiment of the present disclosure. An executive subject of this embodiment of the present disclosure is a computing device. In this embodiment of the present disclosure, the first longitude coordinate range is a longitude coordinate range from −180° to 180°, and the target longitude coordinate range is a longitude coordinate range from 0° to 360°, the first sub-range is a range from −180° to 0°, the second sub-range is a range from 0° to 180°, the third sub-range is a range from 180° to 360°, the first value is 180°, and the second value is 360°. Referring to FIG. 8, the method includes:

801: Display, by the computing device, an electronic map.

802: Determine, by the computing device, multiple position points in the electronic map.

803: Determine, by the computing device based on a target map region currently displayed in the electronic map, a second longitude coordinate range corresponding to the target map region.

The processes of step 801 to step 803 are similar to those of step 401 to step 403, which will not be repeated here.

804: Determine, by the computing device based on the target map region currently displayed in the electronic map, a longitude coordinate of a center point of the target map region.

The computing device determines, from the electronic map, the target map region currently displayed, and determines the longitude coordinate of the center point of the target map region. The longitude coordinate of the center point fall within the first longitude coordinate range. Since the first longitude coordinate range includes the positive numbers and the negative numbers, the longitude coordinate of the center point may be greater than 0° or may not be greater than 0°.

805: Determine, by the computing device, a longitude coordinate range from 0° to 360° as a target longitude coordinate range in response to that the longitude coordinate of the center point is greater than 0°.

The computing device determines whether the longitude coordinate of the center point is greater than 0° or not. If the longitude coordinate of the center point is greater than 0°, the longitude coordinate range from 0° to 360° will be determined, from the multiple longitude coordinate ranges of the electronic map, as the target longitude coordinate range. Therefore, the target longitude coordinate range does not include negative numbers.

806: For every two adjacent position points of the multiple position points, add, by the computing device, 360° to a longitude coordinate in longitude coordinates of two position points that does not fall within the target longitude coordinate range in response to that an absolute value of a difference between the longitude coordinates of the two position points is greater than 180°.

The computing device traverses every two adjacent position points of the multiple position points in sequence. For two adjacent position points currently traversed, the computing device determines the absolute value of the difference between the longitude coordinates of these two position points. If the absolute value is greater than 180°, and plotting is performed directly based on the longitude coordinates of these two position points, a resulting curve will have an error. Therefore, the computing device determines the longitude coordinate in the longitude coordinates of the two position points that does not fall within the target longitude coordinate range, and adds 360° to the longitude coordinate that does not fall within the target longitude coordinate range, that is, 360° is added to the longitude coordinate that is less than 0°, so as to be converted to the target longitude coordinate range, so that the longitude coordinates of these two position points both fall within the target longitude coordinate range. Since the target longitude coordinate range in this embodiment of the present disclosure does not include negative numbers, there is no case that one of the converted longitude coordinates is a positive number and the other converted longitude coordinate is a negative number.

Since the electronic map is used for representing regions on the earth, and the earth may be regarded as a 360° sphere, a longitude coordinate obtained by adding 360° to the longitude coordinate of one position point still represents the position point, except that the value of the longitude coordinate has changed. Therefore, while the longitude coordinate is converted, it is guaranteed that the position point will not be misplaced.

807: Add, by the computing device, 360° to the longitude coordinates of the two position points in response to that the absolute value of the difference between the longitude coordinates of two position points is not greater than 180°, and in response to that the longitude coordinates of the two position points do not fall within the target longitude coordinate range and do not fall within the second longitude coordinate range.

In response to that the absolute value of the difference between the longitude coordinates of the two position points is not greater than 180°, the shortest route between these two position points will not cross the 180° longitude line. The computing device determines whether the longitude coordinates of these two position points fall within the target longitude coordinate range or not, and whether the longitude coordinates of these two position points fall within the second longitude coordinate range or not.

If the longitude coordinates of the two position points do not fall within the target longitude coordinate range and do not fall within the second longitude coordinate range, it indicates that these two position points are at the same side as the position points with the longitude coordinates converted in step 806, and if the longitude coordinates of these two position points are still kept unchanged, an error will occur when plotting a curve that connects these two position points with the position points with the longitude coordinates converted in step 806. Therefore, the computing device adds 360° to the longitude coordinates of these two position points, and thereby, the longitude coordinates of these two position points are converted to the target longitude coordinate range.

For example, in step 806, two position points are a point A1 and a point B1, the longitude coordinate of the point A1 is 170°, the longitude coordinate of the point B1 is −170°, the target longitude coordinate range is a longitude coordinate range from 0° to 360°, and the second longitude coordinate range is "150° to 180° to 210°". In step 807, two position points are a point C1 and a point D1, the longitude coordinate of the point C1 is −160° and the longitude coordinate of the point D1 is −150°, and the longitude coordinates of the point C1 and the point D1 do not fall within the target longitude coordinate range or the second longitude coordinate range. If direct plotting is performed without coordinate conversion, a route between the point A1 and the point B1 will have an error, and a route that connects the point B1, the point C1 and the point D1 will not have an error. However, 360° is added to the longitude coordinate of the point B1 by using the method provided by the embodiments of the present disclosure to get 190°. At this time, if the coordinates of the point C1 and the point D1 still remain unchanged, although the route between the point A1 and the point B1 will not have an error, the route that connects the point B1, the point C1 and the point D1 will have an error. Therefore, to guarantee the accuracy of the route, the computing device will also add 360° to the longitude coordinates of the point C1 and the point D1. At this time, the longitude coordinates of the point A1, the point B1, the point C1 and the point D1 are 170°, 190°, 200° and 210°, respectively. Therefore, there will no error for plotting a route that connects the point A1, the point B1, the point C1 and the point D1 in order of the longitude coordinates.

If the longitude coordinates of the two position points do not fall within the target longitude coordinate range, but fall within the second longitude coordinate range, and in response to that the longitude coordinates of the two position points are converted to the target longitude coordinate range, the longitude coordinates of the two position points will not fall within the second longitude coordinate range, thereby influencing a route that connects these two position points with other position points falling within the second longitude coordinate range. Therefore, in such a case, the computing device may not execute the step of converting the longitude coordinates of the two position points to the target longitude coordinate range.

For example, the target longitude coordinate range is a longitude coordinate range from 0° to 360°, and the second longitude coordinate range is "−40° to 0° to 40°". In step 807, two position points are a point E1 and a point F1, the longitude coordinate of the point E1 is −30° and the longitude coordinate of the point F1 is −20°, and the longitude coordinates of the point E1 and the point F1 do not fall within the target longitude coordinate range, but fall within the second longitude coordinate range. The second longitude coordinate range further includes a point G1, and the longitude coordinate of the point G1 is 10°. At this time, a route that connects the point E1, the point F1 and the point G1 will not have an error during direct plotting. However, if the computing device converts the coordinates of the point E1 and the point F1 to the target longitude coordinate range, that is, 360° is added to the coordinates, at this time, the longitude coordinates of the point E1, the point F1 and the point G1 are 330°, 340° and 10°, respectively. Although a route between the point E1 and the point F1 will not have an error, a route between the point F1 and the point G1 will have an error. Therefore, in this case, the computing device will not convert the longitude coordinates of the point E1 and the point F1.

If the longitude coordinates of the two position points fall within the target longitude coordinate range, the computing device may not execute the step of converting the longitude coordinates of the two position points to the target longitude coordinate range.

Figure 9:
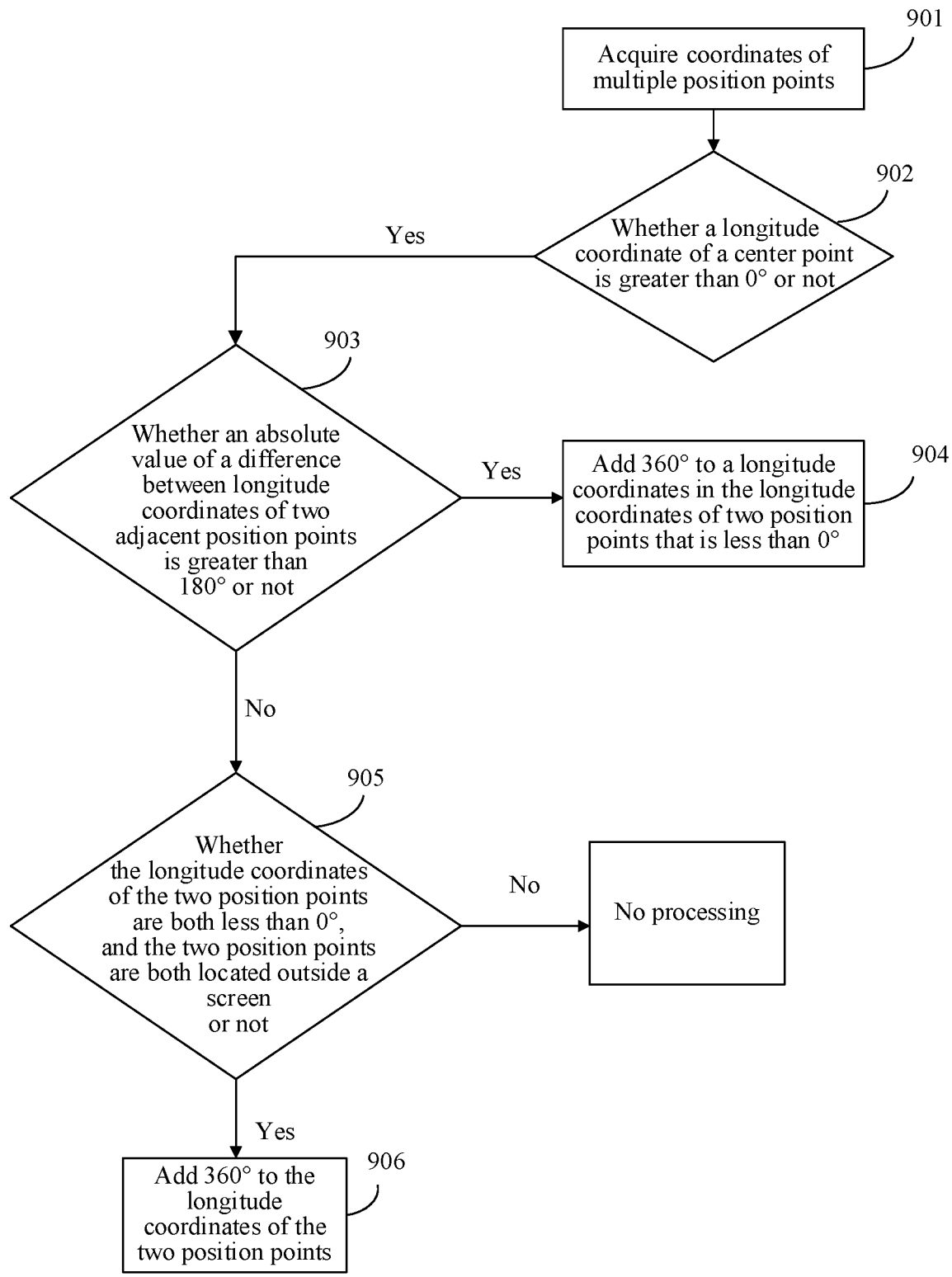
FIG. 9 is a schematic flowchart of a coordinate conversion method according to certain embodiment(s) of the present disclosure.

FIG. 9 is a flowchart of a coordinate conversion method provided by an embodiment of the present disclosure. The first longitude coordinate range is a longitude coordinate range from −180° to 180°, and the target longitude coordinate range is a longitude coordinate range from 0° to 360°. Referring to FIG. 9, the method includes:

901: Acquire, by a computing device, longitude coordinates of multiple position points.

902: Determine, by the computing device, whether a longitude coordinate of a center point of a target map region is greater than 0° or not. It is illustrated in FIG. 9 by taking the longitude coordinate of the center point of the target map region being greater than 0° as an example.

903: Determine, by the computing device, whether an absolute value of a difference between longitude coordinates of two adjacent position points of the multiple position points is greater than 180° or not, if it is greater than 180°, perform step 904 below, and if it is not greater than 180°, perform step 905 below.

904: Add, by the computing device, 360° to a longitude coordinate in the longitude coordinates of two position points that is less than 0°.

905: Determine, by the computing device, whether the longitude coordinates of the two position points are both less than 0° or not and whether the two position points are both located outside a screen or not, if so, perform step 906 below, and if not, no processing will be done. The position point located outside the screen refers to that the longitude coordinate of the position point does not fall within the second longitude coordinate range corresponding to the target map region currently displayed.

906: Add, by the computing device, 360° to the longitude coordinates of the two position points.

808: Plot, by the computing device in order of converted longitude coordinates, a route formed by connecting the multiple position points in the electronic map.

According to the method provided by the embodiments of the present disclosure, considering that in response to that the longitude coordinate of the center point is greater than 0°, there are many position points with the longitude coordinates greater than 0° in the target map region currently displayed, the longitude coordinate range from 0° to 360° is determined as the target longitude coordinate range, thereby reducing the quantity of the position points in the multiple position points that do not fall within the target longitude coordinate range, i.e., reducing the quantity of position points that desire coordinate conversion. As a result, the amount of arithmetic operations in the route plotting process is reduced, which is conducive to improving the efficiency of route plotting.

Figure 10:
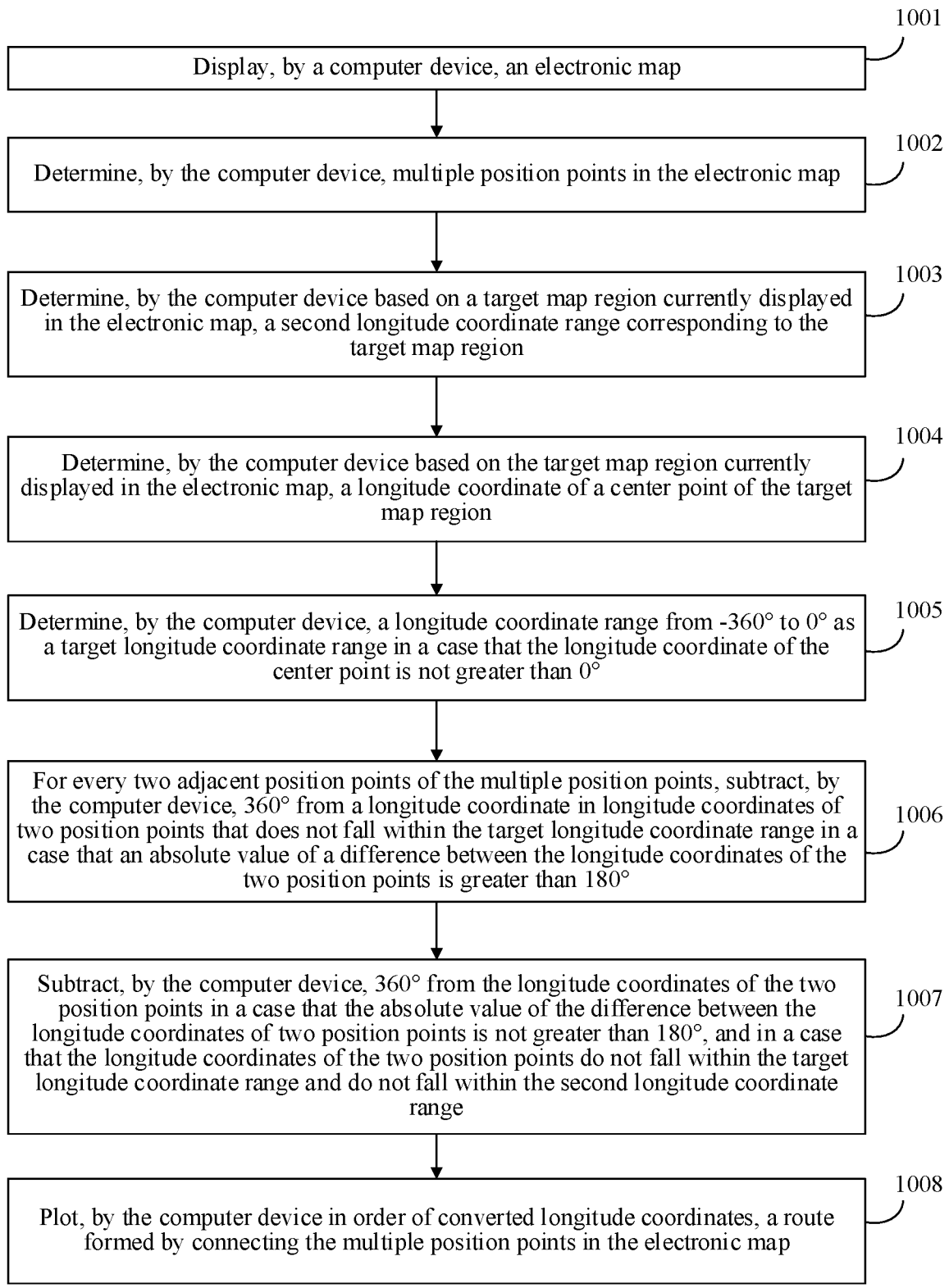
FIG. 10 is a schematic flowchart of yet another route plotting method according to certain embodiment(s) of the present disclosure.

FIG. 10 is a flowchart of yet another route plotting method provided by an embodiment of the present disclosure. An executive subject of this embodiment of the present disclosure is a computing device. In this embodiment of the present disclosure, the first longitude coordinate range is a longitude coordinate range from −180° to 180°, and the target longitude coordinate range is a longitude coordinate range from −360° to 0°, the first sub-range is a range from 0° to 180°, the second sub-range is a range from −180° to 0°, the third sub-range is a range from −360° to −180°, the first value is 180°, and the second value is 360°. The route plotting method is illustrated. Referring to FIG. 10, the method includes:

1001: Display, by the computing device, an electronic map.

1002: Determine, by the computing device, multiple position points in the electronic map.

1003: Determine, by the computing device based on a target map region currently displayed in the electronic map, a second longitude coordinate range corresponding to the target map region.

Step 1001 to step 1003 are similar to step 401 to step 403, which will not be repeated here.

1004: Determine, by the computing device based on the target map region currently displayed in the electronic map, a longitude coordinate of a center point of the target map region.

1005: Determine, by the computing device, a longitude coordinate range from −360° to 0° as a target longitude coordinate range in response to that the longitude coordinate of the center point is not greater than 0°.

The computing device determines whether the longitude coordinate of the center point is greater than 0° or not. If the longitude coordinate of the center point is not greater than the longitude coordinate range from −360° to 0° will be determined, from the multiple longitude coordinate ranges of the electronic map, as the target longitude coordinate range. Therefore, the target longitude coordinate range does not include positive numbers.

1006: For every two adjacent position points of the multiple position points, subtract, by the computing device, 360° from a longitude coordinate in longitude coordinates of two position points that does not fall within the target longitude coordinate range in response to that an absolute value of a difference between the longitude coordinates of the two position points is greater than 180°.

The computing device traverses every two adjacent position points of the multiple position points in sequence. For two adjacent position points currently traversed, the computing device determines the absolute value of the difference between the longitude coordinates of these two position points. If the absolute value is greater than 180°, and plotting is performed directly based on the longitude coordinates of these two position points, a resulting curve will have an error. Therefore, the computing device determines the longitude coordinate in the longitude coordinates of the two position points that does not fall within the target longitude coordinate range, and subtracts 360° from the longitude coordinate that does not fall within the target longitude coordinate range, that is, 360° is subtracted from the longitude coordinate that is greater than 0°, so as to be converted to the target longitude coordinate range, so that the longitude coordinates of these two position points both fall within the target longitude coordinate range. Since the target longitude coordinate range in this embodiment of the present disclosure does not include positive numbers, there is no case that one of the converted longitude coordinates is a positive number and the other converted longitude coordinate is a negative number.

Since the electronic map is used for representing regions on the earth, and the earth may be regarded as a 360° sphere, a longitude coordinate obtained by subtracting 360° from the longitude coordinate of one position point still represents the position point, except that the value of the longitude coordinate has changed. Therefore, while the longitude coordinate is converted, it is guaranteed that the position point will not be misplaced.

1007: Subtract, by the computing device, 360° from the longitude coordinates of the two position points in response to that the absolute value of the difference between the longitude coordinates of two position points is not greater than 180°, and in response to that the longitude coordinates of the two position points do not fall within the target longitude coordinate range and do not fall within the second longitude coordinate range.

In response to that the absolute value of the difference between the longitude coordinates of the two position points is not greater than 180°, the shortest route between these two position points will not cross the 180° longitude line. The computing device determines whether the longitude coordinates of these two position points fall within the target longitude coordinate range or not, and whether the longitude coordinates of these two position points fall within the second longitude coordinate range or not.

If the longitude coordinates of the two position points do not fall within the target longitude coordinate range and do not fall within the second longitude coordinate range, it indicates that these two position points are at the same side as the position points with the longitude coordinates converted in step 1006, and if the longitude coordinates of these two position points are still kept unchanged, an error will occur when plotting a curve that connects these two position points with the position points with the longitude coordinates converted in step 1006. Therefore, the computing device subtracts 360° from the longitude coordinates of these two position points, and thereby, the longitude coordinates of these two position points are converted to the target longitude coordinate range.

For example, in step 1006, two position points are a point A2 and a point B2, the longitude coordinate of the point A2 is −170°, the longitude coordinate of the point B2 is 170°, the target longitude coordinate range is a longitude coordinate range from −360° to 0°, and the second longitude coordinate range is "−210° to −180° to −150°". In step 1007, two position points are a point C2 and a point D2, the longitude coordinate of the point C2 is 160° and the longitude coordinate of the point D2 is 150°, and the longitude coordinates of the point C2 and the point D2 do not fall within the target longitude coordinate range or the second longitude coordinate range. If direct plotting is performed without coordinate conversion, a route between the point A2 and the point B2 will have an error, and a route that connects the point B2, the point C2 and the point D2 will not have an error. However, 360° is subtracted from the longitude coordinate of the point B2 by using the method provided by the embodiments of the present disclosure to get −190°. At this time, if the coordinates of the point C2 and the point D2 still remain unchanged, although the route between the point A2 and the point B2 will not have an error, the route that connects the point B2, the point C2 and the point D2 will have an error. Therefore, to guarantee the accuracy of the route, the computing device will also subtract 360° from the longitude coordinates of the point C2 and the point D2. At this time, the longitude coordinates of the point A2, the point B2, the point C2 and the point D2 are −170°, −190°, −200° and −210°, respectively. Therefore, there will not error for plotting a route that connects the point A2, the point B2, the point C2 and the point D2 in order of the longitude coordinates.

If the longitude coordinates of the two position points do not fall within the target longitude coordinate range, but fall within the second longitude coordinate range, and in response to that the longitude coordinates of the two position points are converted to the target longitude coordinate range, the longitude coordinates of the two position points will not fall within the second longitude coordinate range, thereby influencing a route that connects these two position points with other position points falling within the second longitude coordinate range. Therefore, in such a case, the computing device may not execute the step of converting the longitude coordinates of the two position points to the target longitude coordinate range.

For example, the target longitude coordinate range is a longitude coordinate range from −360° to 0°, and the second longitude coordinate range is "−40° to 0° to 40°". In step 1007, two position points are a point E2 and a point F2, the longitude coordinate of the point E2 is 30° and the longitude coordinate of the point F2 is 20°, and the longitude coordinates of the point E2 and the point F2 do not fall within the target longitude coordinate range, but fall within the second longitude coordinate range. The second longitude coordinate range further includes a point G2, and the longitude coordinate of the point G2 is −10°. At this time, a route that connects the point E2, the point F2 and the point G2 will not have an error during direct plotting. However, if the computing device converts the coordinates of the point E2 and the point F2 to the target longitude coordinate range, that is, 360° is subtracted from the coordinates, at this time, the longitude coordinates of the point E2, the point F2 and the point G2 are −330°, −340° and −10°, respectively. Although a route between the point E2 and the point F2 will not have an error, a route between the point F2 and the point G2 will have an error. Therefore, in this case, the computing device will not convert the longitude coordinates of the point E2 and the point F2.

If the longitude coordinates of the two position points fall within the target longitude coordinate range, the computing device may not execute the step of converting the longitude coordinates of the two position points to the target longitude coordinate range.

Figure 11:
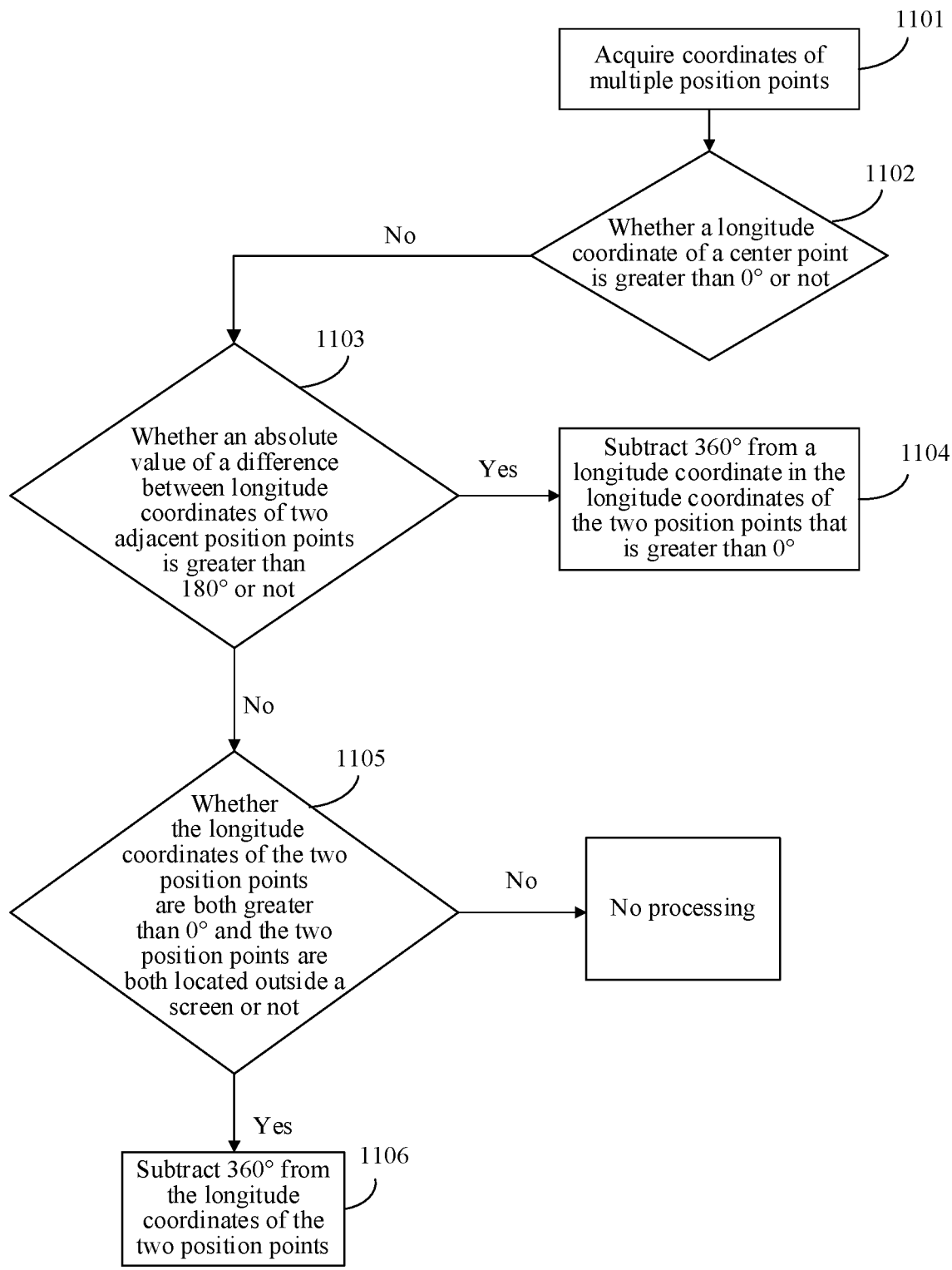
FIG. 11 is a schematic flowchart of another coordinate conversion method according to certain embodiment(s) of the present disclosure.

FIG. 11 is a flowchart of another coordinate conversion method provided by an embodiment of the present disclosure. The first longitude coordinate range is a longitude coordinate range from −180° to 180°, and the target longitude coordinate range is a longitude coordinate range from −360° to 0°. Referring to FIG. 11, the method includes:

1101: Acquire, by a computing device, longitude coordinates of multiple position points.

1102: Determine, by the computing device, whether a longitude coordinate of a center point of a target map region is greater than 0° or not. It is illustrated in FIG. 11 by taking the longitude coordinate of the center point of the target map region being not greater than 0° as an example.

1103: Determine, by the computing device, whether an absolute value of a difference between longitude coordinates of two adjacent position points of the multiple position points is greater than 180° or not, if it is greater than 180°, perform step 1104 below, and if it is not greater than 180°, perform step 1105 below.

1104: Subtract, by the computing device, 360° from a longitude coordinate in the longitude coordinates of two position points that is greater than 0°.

1105: Determine, by the computing device, whether the longitude coordinates of the two position points are both less than 0° or not and whether the two position points are both located outside a screen or not, if so, perform step 1106 below, and if not, no processing will be done. The position point located outside the screen refers to that the longitude coordinate of the position point does not fall within the second longitude coordinate range corresponding to the target map region currently displayed.

1106: Subtract, by the computing device, 360° from the longitude coordinates of the two position points.

1008: Plot, by the computing device in order of converted longitude coordinates, a route formed by connecting the multiple position points in the electronic map.

According to the method provided by the embodiments of the present disclosure, considering that in response to that the longitude coordinate of the center point is less than 0°, there are many position points with the longitude coordinates less than 0° in the target map region currently displayed, the longitude coordinate range from −360° to 0° is determined as the target longitude coordinate range, thereby reducing the quantity of the position points in the multiple position points that do not fall within the target longitude coordinate range, i.e., reducing the quantity of position points that desire coordinate conversion. As a result, the amount of arithmetic operations in the route plotting process is reduced, which is conducive to improving the efficiency of route plotting.

Figure 12:
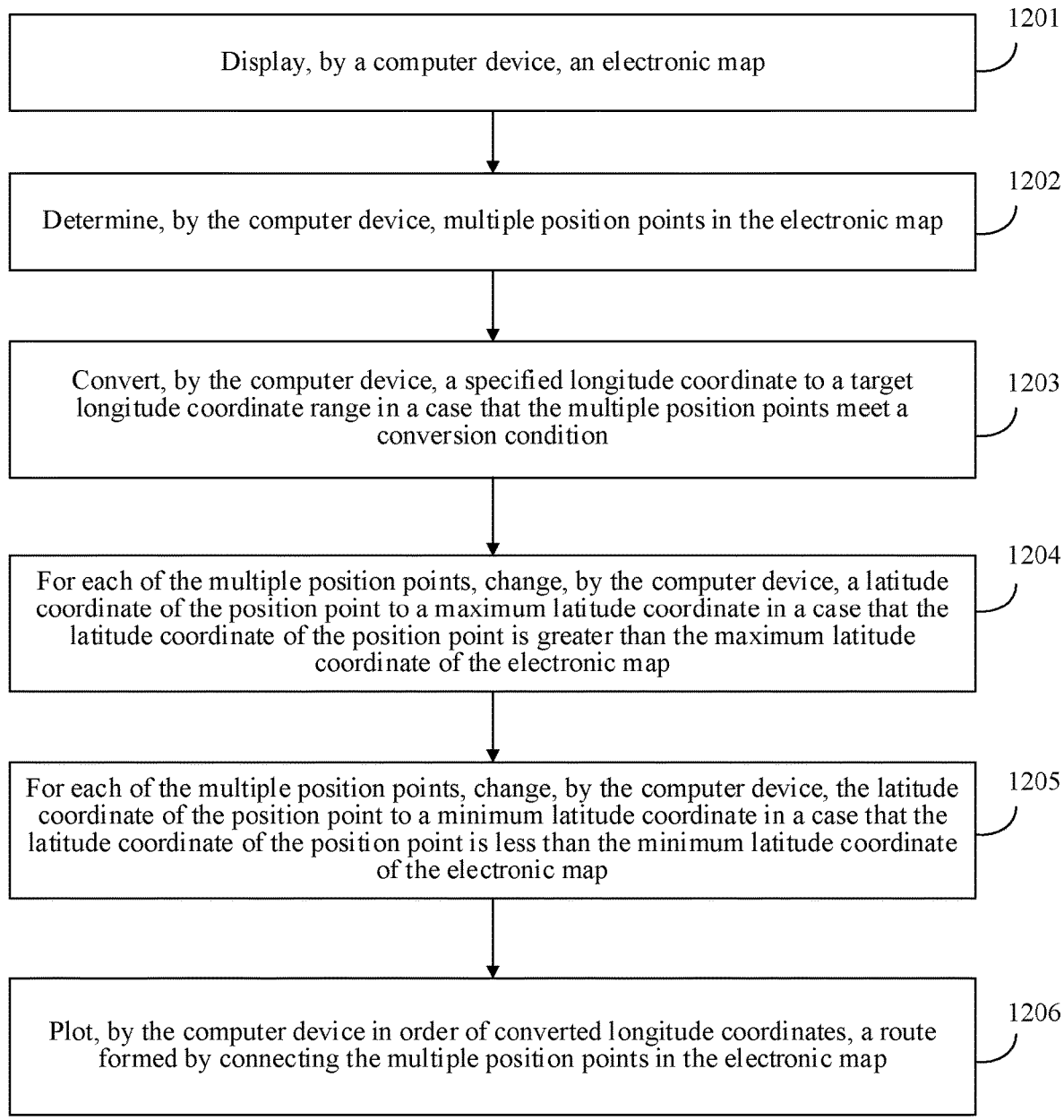
FIG. 12 is a schematic flowchart of still another route plotting method according to certain embodiment(s) of the present disclosure.

FIG. 12 is a flowchart of still another route plotting method provided by an embodiment of the present disclosure. An executive subject of this embodiment of the present disclosure is a computing device. Referring to FIG. 12, the method includes:

1201: Display, by the computing device, an electronic map.

1202: Determine, by the computing device, multiple position points in the electronic map.

1203: Convert, by the computing device, a project longitude coordinate to the target longitude coordinate range in response to that the multiple position points meet a conversion condition.

Steps 1201 to 1203 are similar to steps 401 to 405, steps 801 to 807, or steps 1001 to 1007, which will not be repeated here.

1204: For each of the multiple position points, change, by the computing device, a latitude coordinate of the position point to a maximum latitude coordinate in response to that the latitude coordinate of the position point is greater than the maximum latitude coordinate of the electronic map.

The computing device will also acquire the latitude coordinate of each position point, and the maximum latitude coordinate of the electronic map. The computing device traverses each of the multiple position points in sequence. For the position point currently traversed, if the latitude coordinate of the position point is greater than the maximum latitude coordinate of the electronic map, the computing device may not plot the position point in the electronic map subsequently. As a result, routes between the position point and other position points may not be plotted or are incomplete when plotting the route between the starting point and the end point. Therefore, the computing device changes the latitude coordinate of the position point to the maximum latitude coordinate of the electronic map, so that the position point and the routes between the position point and other position points may be plotted in the electronic map subsequently, thereby achieving a visualization effect of route plotting.

1205: For each of the multiple position points, change, by the computing device, the latitude coordinate of the position point to a minimum latitude coordinate in response to that the latitude coordinate of the position point is less than the minimum latitude coordinate of the electronic map.

Similar to step 1204, if the latitude coordinate of the position point is less than the minimum latitude coordinate of the electronic map, the computing device may not plot the position point in the electronic map subsequently. As a result, routes between the position point and other position points may not be plotted or are incomplete when plotting the route between the starting point and the end point. Therefore, the computing device changes the latitude coordinate of the position point to the minimum latitude coordinate of the electronic map, so that the position point and the routes between the position point and other position points may be plotted in the electronic map subsequently, thereby achieving a visualization effect of route plotting.

The electronic map is obtained by projecting the earth onto a plane, while there will be a loss of some information due to projecting the surface of a sphere onto a plane. For example, the latitude range of the earth is from −90° to 90°, and the electronic map obtained after projecting does not include information about the Antarctic and Arctic regions of the earth. The latitude range of the electronic map is from −85° to 85°. If the latitude coordinate of a point M of the multiple position points is 90°, the computing device changes the latitude coordinate of the point M to 85°. If the latitude coordinate of a point N of the multiple position points is −90°, the computing device changes the latitude coordinate of the point N to −85°.

The embodiments of the present disclosure are illustrated by taking performing step 1204 and step 1205 as an example. In another embodiment, the computing device may also only perform step 1204, but skip performing step 1205, or only perform step 1205, but skip performing step 1204, which will not be limited by the embodiments of the present disclosure.

1206: Plot, by the computing device in order of converted longitude coordinates, a route formed by connecting the multiple position points in the electronic map.

According to the method provided by the embodiments of the present disclosure, in response to that the latitude coordinate of the position point is greater than the maximum latitude coordinate of the electronic map, the latitude coordinate of the position point is changed to the maximum latitude coordinate, so that the position point and the routes between the position point and other position points may be plotted in the electronic map subsequently, thereby improving the visualization effect of route plotting.

Moreover, in response to that the latitude coordinate of the position point is less than the minimum latitude coordinate of the electronic map, the latitude coordinate of the position point is changed to the minimum latitude coordinate, so that the position point and the routes between the position point and other position points may be plotted in the electronic map subsequently, thereby improving the visualization effect of route plotting.

Figure 13:
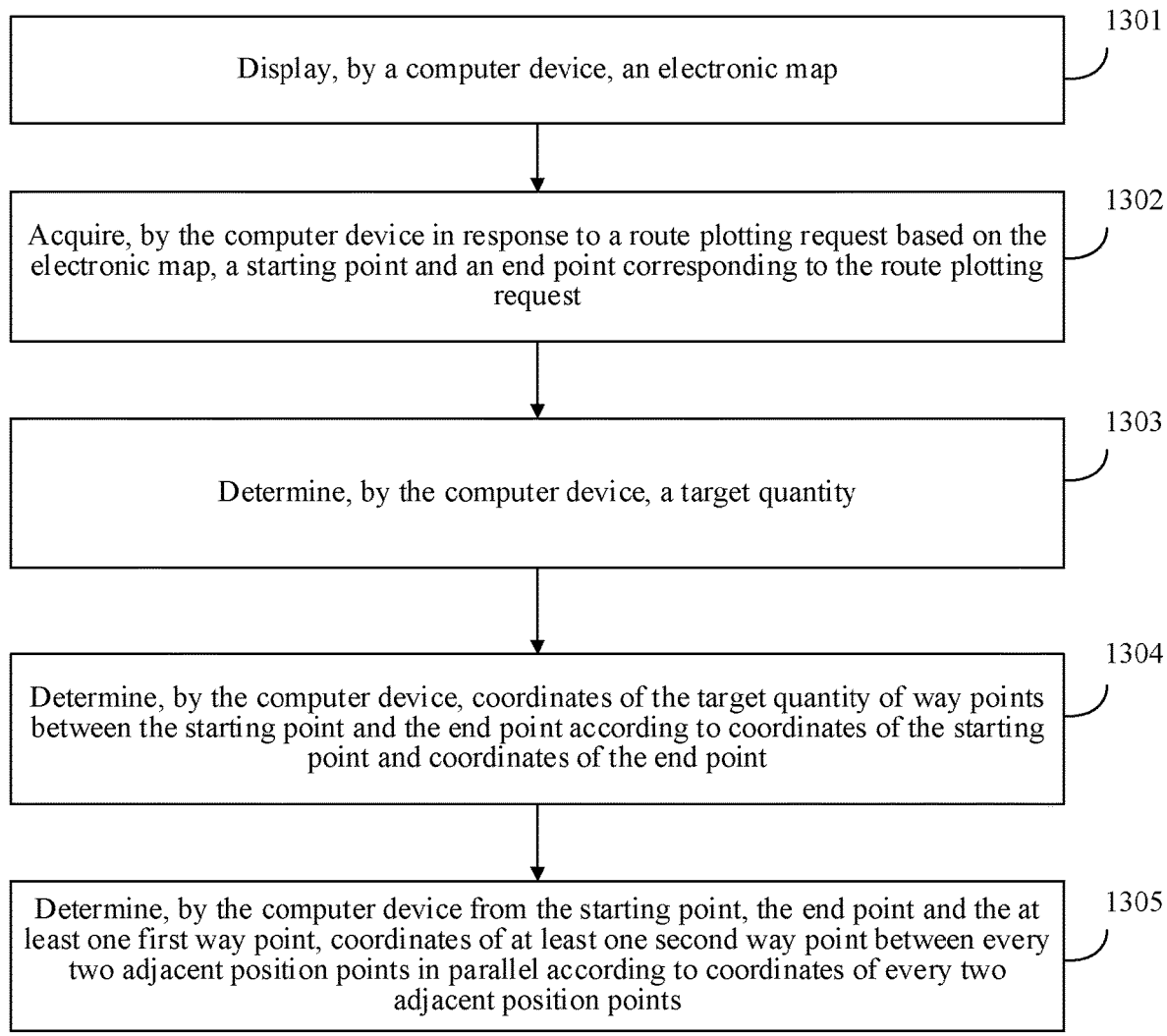
FIG. 13 is a schematic flowchart of a position point determination method according to certain embodiment(s) of the present disclosure.

FIG. 13 is a flowchart of a position point determination method provided by an embodiment of the present disclosure. An executive subject of this embodiment of the present disclosure is a computing device. In this embodiment of the present disclosure, the multiple position points include a starting point, an end point and way points between the starting point and the end point. Referring to FIG. 13, the method includes:

1301: Display, by the computing device, an electronic map.

1302: Acquire, by the computing device in response to a route plotting request based on the electronic map, a starting point and an end point corresponding to the route plotting request.

The route plotting request is used for requesting the plotting of a route between the starting point and the end point in the electronic map.

In one embodiment, the electronic map includes the name of each position, and the route plotting request carries a first position name and a second position name, where the first position name indicates the starting point and the second position name indicates the end point. The computing device acquires the first position name and the second position name in the route plotting request, queries in the electronic map for the starting point corresponding to the first position name and the end point corresponding to the second position name, and determines coordinates of the starting point and coordinates of the end point, where the coordinates include a longitude coordinate and a latitude coordinate.

1303. Determine, by the computing device, a target quantity.

The target quantity indicates the quantity of first way points determined between the starting point and the end point.

In one embodiment, the computing device determines, based on the target map region currently displayed in the electronic map, a maximum longitude coordinate difference and a maximum latitude coordinate difference of the target map region, determines a target longitude coordinate difference between the starting point and the end point, and a target latitude coordinate difference between the starting point and the end point, and determines, based on the maximum longitude coordinate difference, the maximum latitude coordinate difference, the target longitude coordinate difference and the target latitude coordinate difference, the target quantity.

In order to determine an appropriate quantity of first way points between the starting point and the end point, the computing device refers to the maximum longitude coordinate difference and the maximum latitude coordinate difference of the target map region currently displayed, as well as the target longitude coordinate difference and the target latitude coordinate difference between the starting point and the end point, therefore, subsequent fitting of the way points between the starting point and the end point according to the obtained target quantity matches the size of the map region currently displayed, thereby obtaining a better fitting result.

In certain embodiment(s), the determining, by the computing device, based on the maximum longitude coordinate difference, the maximum latitude coordinate difference, the target longitude coordinate difference and the target latitude coordinate difference, the target quantity includes: determining a first ratio between the target longitude coordinate difference and the maximum longitude coordinate difference, and a second ratio between the target latitude coordinate difference and the maximum latitude coordinate difference, and determining, based on the first ratio and the second ratio, the target quantity. The target quantity is positively correlated with the maximum value of the first ratio and the second ratio.

For example, the computing device determines the target quantity by using the following formula.

$$Num = \left[\max\left(\frac{x}{m \cdot 20}, \frac{y}{n \cdot 20}\right)\right]$$

Num represents the target quantity, x represents the target longitude coordinate difference, y represents the target latitude coordinate difference, m represents the maximum longitude coordinate difference, n represents the maximum latitude coordinate difference, max(·) represents taking the maximum value, and [·] represents a rounding operation.

1304: Determine, by the computing device, coordinates of the target quantity of first way points between the starting point and the end point according to the coordinates of the starting point and the coordinates of the end point.

After determining the target quantity, the computing device determines the coordinates of the target quantity of first way points between the starting point and the end point according to the coordinates of the starting point and the coordinates of the end point. The coordinates include a longitude coordinate and a latitude coordinate.

In one embodiment, the computing device fits the coordinates of the first way points between the starting point and the end point in sequence according to a great circle arc line fitting algorithm to obtain the coordinates of the target quantity of first way points. The target quantity of first way points are the way points on a great circle arc line between the starting point and the end point.

In another embodiment, after obtaining the target quantity of first way points, the computing device determines a distance between every two adjacent first way points. In response to that the distance between two adjacent first way points is less than a threshold distance, the computing device discards one of these two first way points. Since one way point is still reserved, the subsequent plotting effect will not be influenced. Therefore, on the premise of not influencing the plotting effect, the quantity of the way points is reduced, and the computation amount of route plotting is reduced.

1305: Determine, by the computing device from the starting point, the end point and the at least one first way point, coordinates of at least one second way point between every two adjacent position points in parallel according to coordinates of every two adjacent position points.

After determining the starting point, the end point and the first way points between the starting point and the end point, the computing device determines, from the multiple position points, the coordinates of at least one second way point between every two adjacent position points in parallel according to the coordinates of every two adjacent position points. Therefore, by performing step 1304 and step 1305, the computing device obtains at least one first way point and at least one second way point between the starting point and the end point.

The process of determining the first way points in step 1304 may be regarded as a fitting process of coarse precision, and the process of determining the second way points in step 1305 may be regarded as a fitting process of fine precision. Since the computing device fits the second way points between every two adjacent position points in parallel in step 1305, multiple second way points may be fitted out simultaneously. Therefore, the fitting process of the way points is divided into two stages in this embodiment of the present disclosure. In the first stage, the way points between the starting point and the end point are fitted in sequence, and in the second stage, the way points between two adjacent position points are fitted in parallel, thereby achieving the effect of fitting multiple way points simultaneously. As a result, the fitting speed of the way points is improved.

For example, the starting point is a point A, and the end point is a point B. In the first stage, the computing device fits out a point C and a point D between the point A and the point B. At this time, the computing device obtains the point A, the point C, the point D and the point B arranged in sequence. In the second stage, the computing device fits way points between the point A and the point C, way points between the point C and the point D and way points between the point D and the point B in parallel.

In this embodiment of the present disclosure, by performing steps 1304 to 1305, the coordinates of the way points between the starting point and the end point may be determined according to the coordinates of the starting point and the coordinates of the end point.

Figure 14:
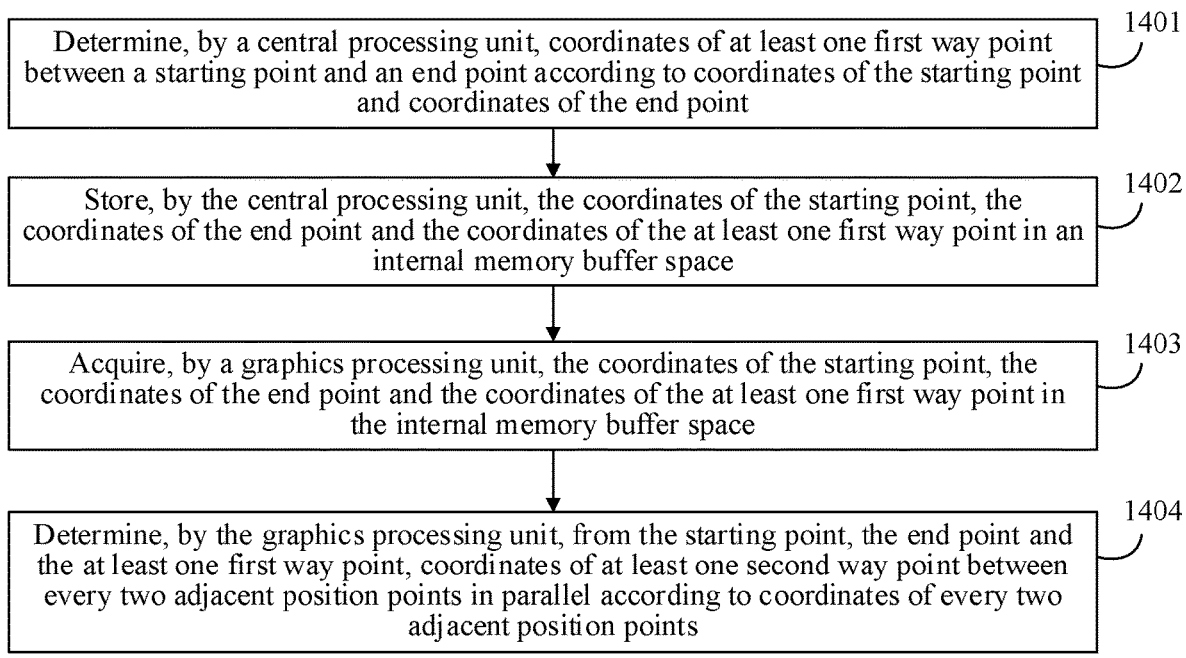
FIG. 14 is a schematic flowchart of another position point determination method according to certain embodiment(s) of the present disclosure.

In one embodiment, the computing device determines the multiple way points between the starting point and the end point by collaboration between a central processing unit (CPU) and a graphics processing unit (GPU). As shown in FIG. 14, steps 1304 to 1305 may be replaced with steps 1401 to 1404 below.

1401: Determine, by a central processing unit, coordinates of at least one first way point between a starting point and an end point according to coordinates of the starting point and coordinates of the end point.

1402: Store, by the central processing unit, the coordinates of the starting point, the coordinates of the end point and the coordinates of the at least one first way point in an internal memory buffer space.

In certain embodiment(s), the coordinates determined by the central processing unit are 64-bit floating-point values. The central processing unit firstly converts the coordinates from the 64-bit floating-point values to 32-bit floating-point values, and stores the converted coordinates in the internal memory buffer space.

1403: Acquire, by a graphics processing unit, the coordinates of the starting point, the coordinates of the end point and the coordinates of the at least one first way point in the internal memory buffer space.

1404: Determine, by the graphics processing unit, from the starting point, the end point and the at least one first way point, coordinates of at least one second way point between every two adjacent position points in parallel according to coordinates of every two adjacent position points.

Considering that the graphics processing unit has the ability to fit the position points in parallel, complex fitting arithmetic operations of the position point are transferred to the graphics processing unit for multi-channel parallel processing, thereby improving the fitting speed of the position points.

In certain embodiment(s), the graphics processing unit includes a vertex shader and a fragment shader. The computing device performs the fitting arithmetic operations of the position point by the vertex shader to obtain the coordinates of the at least one second way point between every two adjacent position points. The coordinates of at least one of these position points such as the starting point, the end point, the first way points and the second way points are converted by the vertex shader by using the method in the embodiment, and the converted coordinates are inputted into the fragment shader. A curve that connects the multiple position points is plotted in an electronic map by the fragment shader according to the coordinates of the multiple position points, thereby obtaining the route between the starting point and the end point.

According to the method provided by the embodiments of the present disclosure, the fitting process of the way points is divided into two stages. In the first stage, the way points between the starting point and the end point are fitted in sequence, and in the second stage, the way points between two adjacent position points are fitted in parallel, thereby achieving the effect of fitting multiple way points simultaneously. As a result, the fitting duration of the way points is shortened, and the fitting speed of the way points is improved.

Moreover, when the quantity of the first way points fitted is determined, reference is made to the maximum longitude coordinate difference and the maximum latitude coordinate difference of the target map region currently displayed, as well as the target longitude coordinate difference and the target latitude coordinate difference between the starting point and the end point, therefore, subsequent fitting of the way points between the starting point and the end point according to the obtained target quantity matches the size of the map region currently displayed, thereby obtaining a better fitting result.

Moreover, in response to that the distance between two adjacent first way points is less than a threshold distance, one of these two first way points is discarded. Since one way point is still reserved, the subsequent plotting effect will not be influenced. Therefore, on the premise of not influencing the plotting effect, the quantity of the way points is reduced, and the computation amount of route plotting is reduced.

The route plotting method provided by the embodiments of the present disclosure may be applied to any scenario of plotting a route in the electronic map.

For example, a scenario of plotting the shortest navigation route in the electronic map. Usually, airplanes or ships navigate along the shortest navigation route between the starting point and the end point. The shortest navigation route is a great circle course line between the starting point and the end point, where the longitude coordinates of the starting point and the end point both fall within −180° to 180°. If the 180° longitude line is crossed between the starting point and the end point, and there is a sudden change of 180° to −180° between the longitude coordinates of the starting point and the end point, one of the longitude coordinates of the starting point and the end point is a positive number, and the other longitude coordinate is a negative number. Thus, when the great circle course line is plotted according to the magnitude of the longitude coordinates, there will be position offset or dislocation of the plotted course line.

Therefore, a longitude coordinate in the longitude coordinates of the starting point and the end point that is less than 0 may be converted to a positive number by using the route plotting method provided by the embodiments of the present disclosure in response to that the 180° longitude line is crossed between the starting point and the end point, and thereby, the longitude coordinates of the starting point and the end point may be constrained to be between 0° and 360°, or a longitude coordinate in the longitude coordinates of the starting point and the end point that is greater than 0 is converted to a negative number, and the longitude coordinates of the starting point and the end point are constrained to be between −360° and 0°. There is no sudden change of 180° to −180° between the converted longitude coordinates. Therefore, a correct great circle course line may be obtained by performing plotting according to the converted longitude coordinates.

Figure 15:
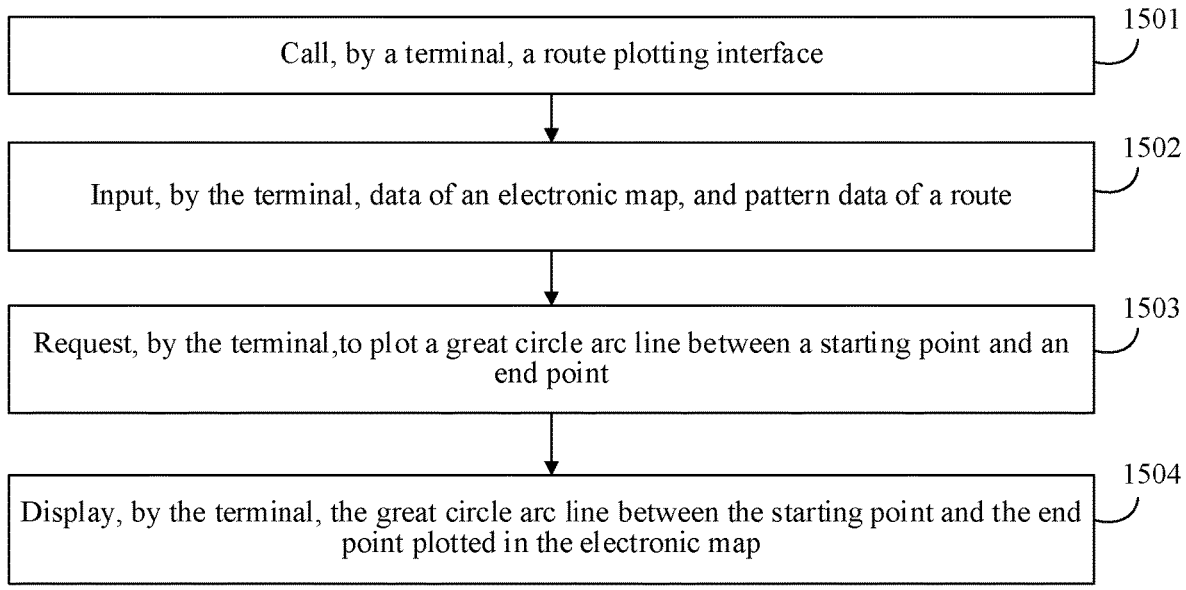
FIG. 15 is a schematic flowchart of still another route plotting method according to certain embodiment(s) of the present disclosure.

A route plotting method provided by the embodiments of the present disclosure may include multiple implementations. For example, a route plotting interface is developed in a Web open map engine JavaScript API GL. The route plotting interface provides the route plotting capability. The route plotting interface is introduced into an application programming interface (API) framework of an electronic map of a terminal, and the terminal may implement route plotting subsequently by using the route plotting interface. As shown in FIG. 15, the route plotting method includes:

1501: Call, by a terminal, a route plotting interface.

1502: Input, by the terminal, data of an electronic map, and pattern data of a route.

1503: Request, by the terminal, to plot a great circle arc line between a starting point and an end point.

1504: Display, by the terminal, the great circle arc line between the starting point and the end point plotted in the electronic map.

Therefore, the visualization of the great circle arc line between the starting point and the end point may be implemented in the electronic map by calling the route plotting interface through the terminal. For example, a visualization solution for the navigation route of an airplane is provided, or a visualization solution for the navigation route of a ship is provided. For example, the terminal may display the plotted great circle arc line in interfaces such as WebView in a mini program, a web or an application (APP).

Figure 16:
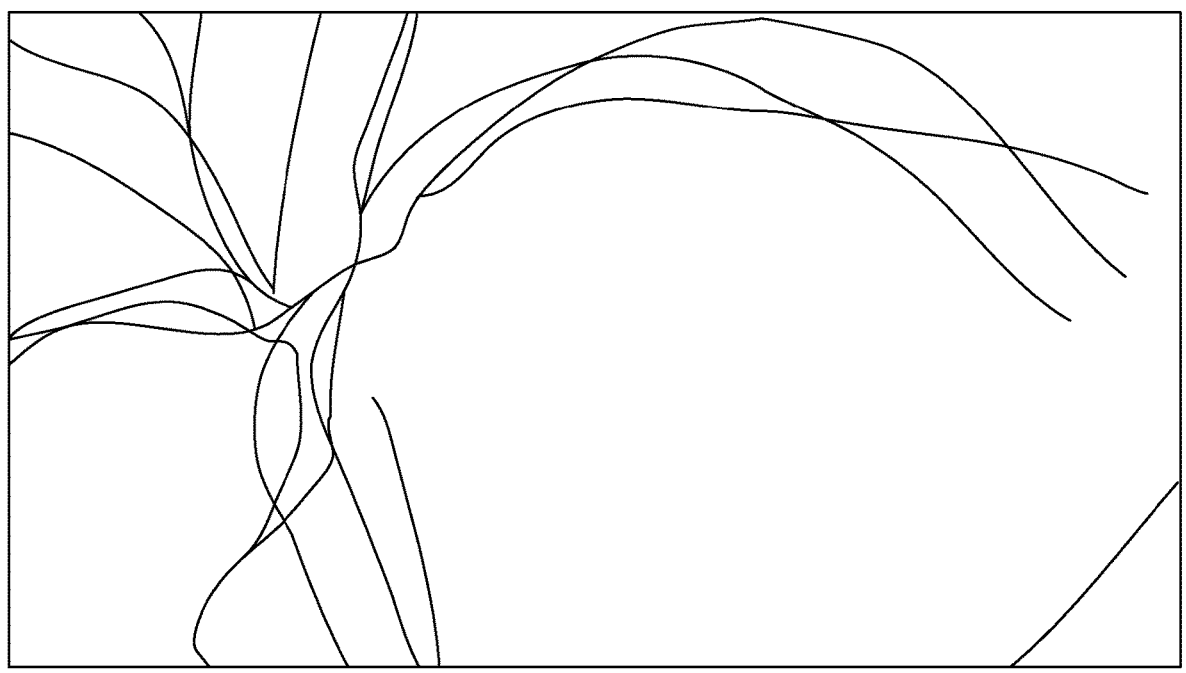
FIG. 16 is a schematic diagram of an electronic map interface according to certain embodiment(s) of the present disclosure.
Figure 17:
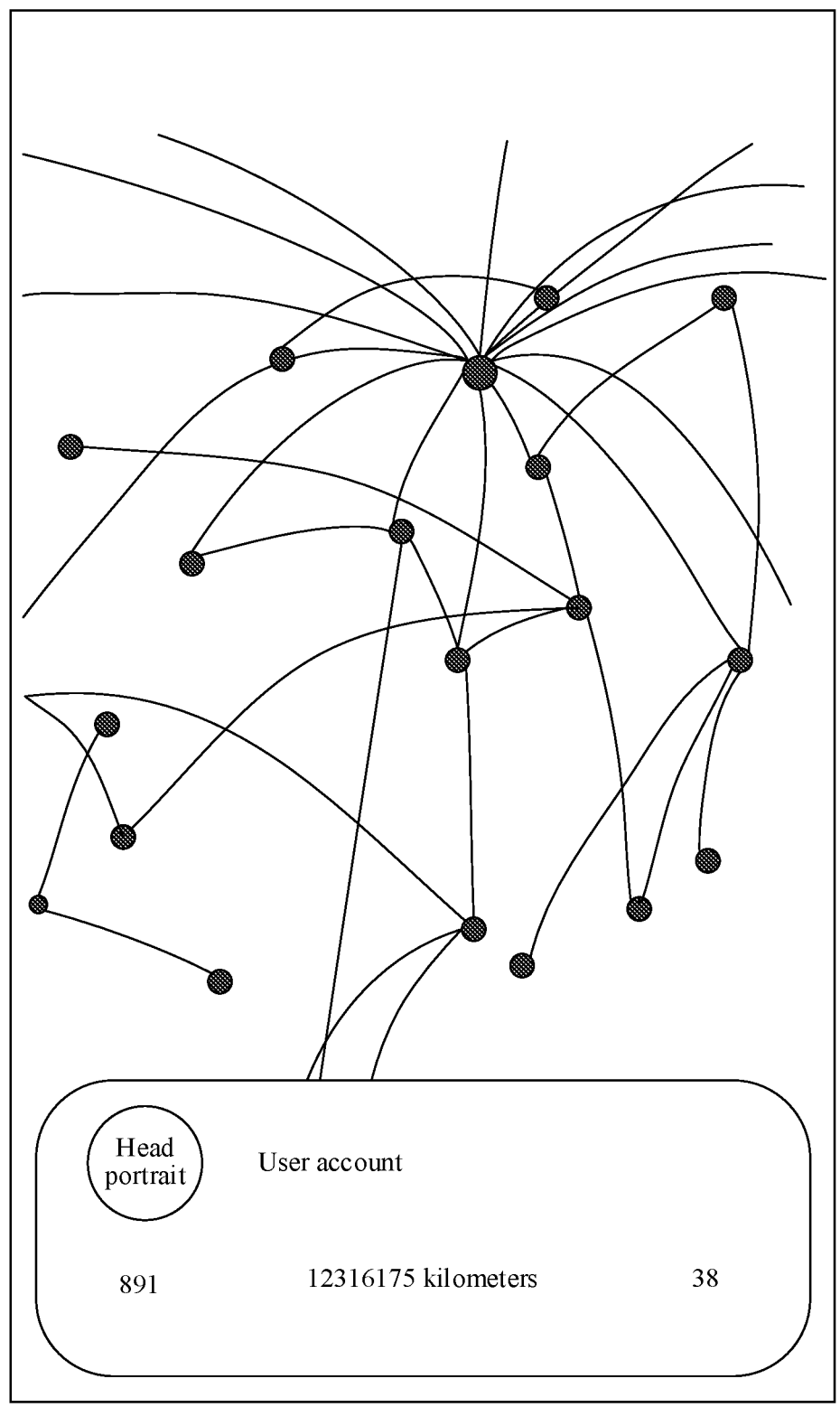
FIG. 17 is a schematic diagram of another electronic map interface according to certain embodiment(s) of the present disclosure.

FIG. 16 is a schematic diagram of an electronic map interface provided by an embodiment of the present disclosure. The electronic map and multiple great circle arc lines plotted in the electronic map are displayed in the electronic map interface, as shown in FIG. 16. Since the electronic map is obtained by projecting the surface of the earth onto a plane, the great circle arc line between two position points are not a straight line between the two position points, but a curve with a radian. FIG. 17 is a schematic diagram of another electronic map interface provided by an embodiment of the present disclosure. The electronic map and great circle arc lines between each starting point and a corresponding end point in historical trips of a user corresponding to a user account, as well as 891 historical trips, 12316175 kilometers in mileage of the historical trips, and 38 cities reached are displayed in the electronic map interface.

Figure 18:
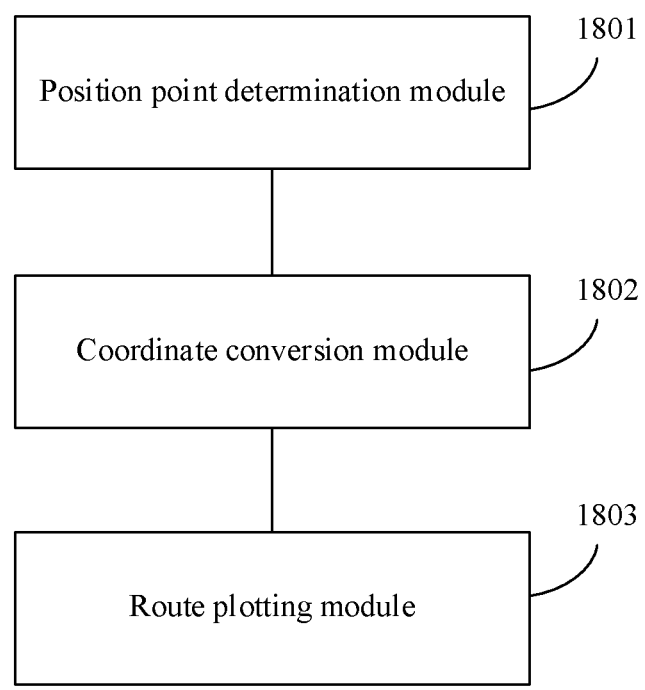
FIG. 18 is a schematic structural diagram of a route plotting apparatus according to certain embodiment(s) of the present disclosure.

FIG. 18 is a schematic structural diagram of a route plotting apparatus provided by an embodiment of the present disclosure. Referring to FIG. 18, the apparatus includes:

a position point determination module 1801, configured to determine multiple position points in an electronic map, the electronic map having a first longitude coordinate range and a target longitude coordinate range, and longitude coordinates of the multiple position points falling within the first longitude coordinate range;

a coordinate conversion module 1802, configured to convert a project longitude coordinate to the target longitude coordinate range in response to that the multiple position points meet a conversion condition, the conversion condition including: an absolute value of a difference between longitude coordinates of adjacent position points is greater than a first value, the first value being a maximum value within the first longitude coordinate range; and the project longitude coordinate is a longitude coordinate in the longitude coordinates of the multiple position points that does not fall within the target longitude coordinate range; and a route plotting module 1803, configured to plot, in order of converted longitude coordinates, a route formed by connecting the multiple position points in the electronic map.

According to the route plotting apparatus provided by the embodiments of the present disclosure, in response to that the absolute value of the difference between the longitude coordinates of adjacent position points is greater than the maximum value of the first longitude coordinate range, it indicates that these two adjacent position points are located at two sides of the longitude line where the minimum longitude coordinate and the maximum longitude coordinate are located, respectively, and if plotting is performed directly according to the longitude coordinates, there will be a problem that the plotted route has an error. Therefore, in order to plot a correct route, the project longitude coordinate is converted to the target longitude coordinate range, so that the longitude coordinates of the multiple position points all fall within the target longitude coordinate range, so as to change the longitude coordinates corresponding to the longitude line that the route between these two position points crosses. At this time, plotting is performed according to the converted longitude coordinates, and thus, the shortest route formed by connecting the multiple position points may be plotted, and the accuracy of route plotting is improved.

Figure 19:
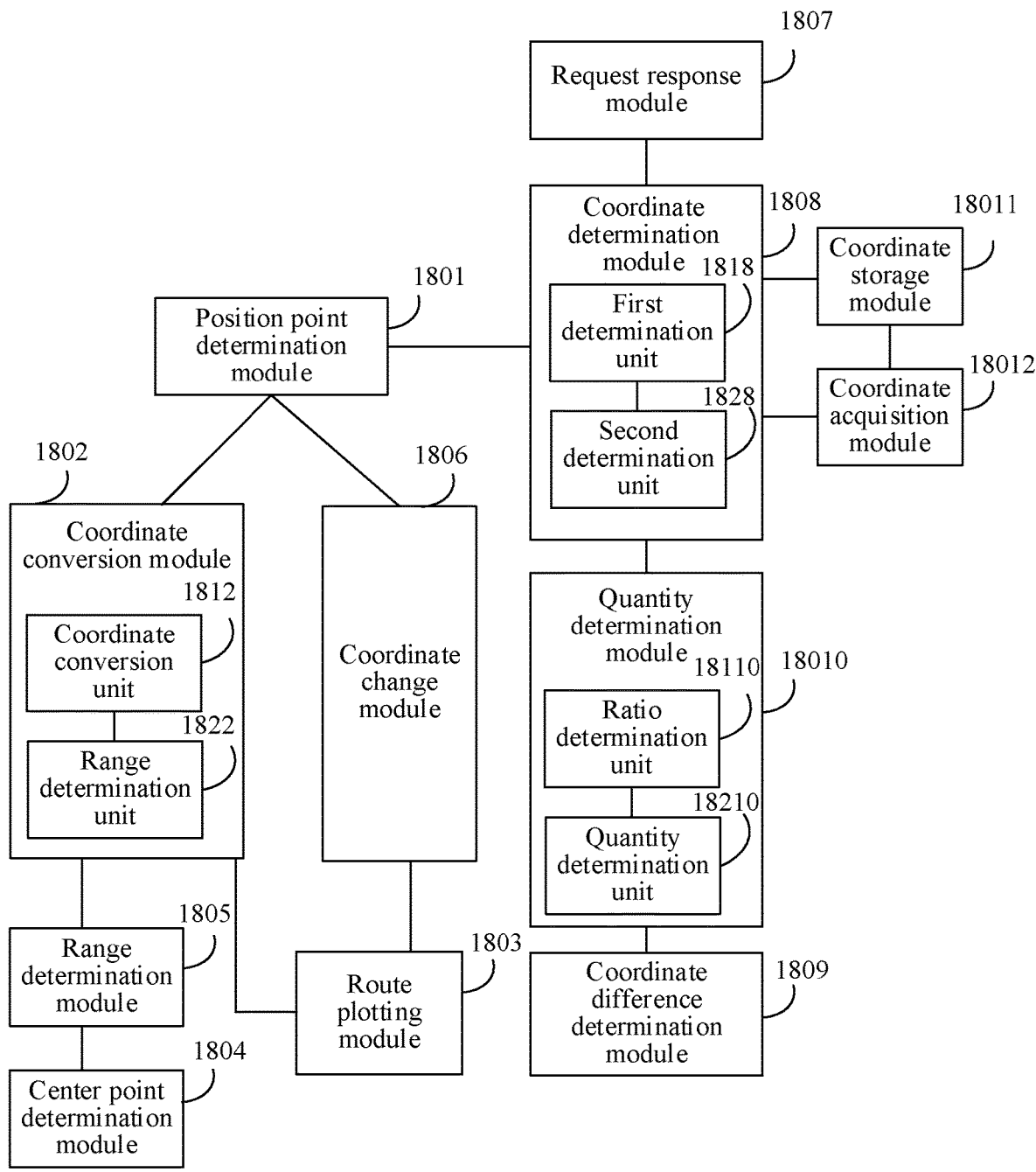
FIG. 19 is a schematic structural diagram of another route plotting apparatus according to certain embodiment(s) of the present disclosure.

In certain embodiment(s), referring to FIG. 19, the first longitude coordinate range includes a first sub-range and a second sub-range, and the target longitude coordinate range includes the second sub-range and a third sub-range. The coordinate conversion module 1802 includes:

a coordinate conversion unit 1812, configured to add, in response to that a maximum value in the third sub-range is greater than a maximum value in the first sub-range, a second value to a longitude coordinate in the longitude coordinates of the multiple position points that does not fall within the second sub-range; or, the coordinate conversion unit 1812, configured to subtract, in response to that the maximum value in the third sub-range is less than the maximum value in the first sub-range, the second value from the longitude coordinate in the longitude coordinates of the multiple position points that does not fall within the second sub-range;

where the second value is an absolute value of a difference between the maximum value in the third sub-range and the maximum value in the first sub-range.

In certain embodiment(s), referring to FIG. 19, the coordinate conversion module 1802 includes:

a range determination unit 1822, configured to determine, based on a target map region currently displayed in an electronic map, a second longitude coordinate range corresponding to the target map region, longitude coordinates within the second longitude coordinate range increasing in sequence; and a coordinate conversion unit 1812, configured to, for every two adjacent position points of the multiple position points, convert a longitude coordinate in longitude coordinates of two position points that does not fall within a target longitude coordinate range to the target longitude coordinate range in response to that an absolute value of a difference between the longitude coordinates of the two position points is greater than a first value; and convert the longitude coordinates of the two position points to the target longitude coordinate range in response to that the absolute value of the difference between the longitude coordinates of the two position points is not greater than the first value, and in response to that the longitude coordinates of the two position points do not fall within the target longitude coordinate range and do not fall within the second longitude coordinate range.

In certain embodiment(s), referring to FIG. 19, the first longitude coordinate range includes a first sub-range and a second sub-range, and the target longitude coordinate range includes the second sub-range and a third sub-range. The coordinate conversion unit 1812 is configured to:

add a second value to the longitude coordinates of the two position points in response to that a maximum value in the third sub-range is greater than a maximum value in the first sub-range, and in response to that the longitude coordinates of the two position points do not fall within the second sub-range and do not fall within the second longitude coordinate range; or, subtract the second value from the longitude coordinates of the two position points in response to that the maximum value in the third sub-range is less than the maximum value in the first sub-range, and in response to that the longitude coordinates of the two position points do not fall within the second sub-range and do not fall within the second longitude coordinate range;

where the second value is an absolute value of a difference between the maximum value in the third sub-range and the maximum value in the first sub-range.

In certain embodiment(s), the first longitude coordinate range includes positive numbers and negative numbers, and the target longitude coordinate range does not include positive numbers or does not include negative numbers.

In certain embodiment(s), referring to FIG. 19, the apparatus further includes:

a center point determination module 1804, configured to determine, based on a target map region currently displayed in the electronic map, a longitude coordinate of a center point of the target map region, the longitude coordinate of the center point falling within the first longitude coordinate range; and a range determination module 1805, configured to determine a longitude coordinate range from 0° to 360° as the target longitude coordinate range in response to that the longitude coordinate of the center point is greater than 0°; and the range determination module 1805 is further configured to determine a longitude coordinate range from −360° to 0° as the target longitude coordinate range in response to that the longitude coordinate of the center point is not greater than 0°.

In certain embodiment(s), referring to FIG. 19, the apparatus further includes a coordinate change module 1806, configured to perform at least one of the following operations:

changing, for each of the multiple position points, a latitude coordinate of the position point to a maximum latitude coordinate in response to that the latitude coordinate of the position point is greater than the maximum latitude coordinate of the electronic map; and changing, for each of the multiple position points, the latitude coordinate of the position point to a minimum latitude coordinate in response to that the latitude coordinate of the position point is less than the minimum latitude coordinate of the electronic map.

In certain embodiment(s), referring to FIG. 19, a route plotting module 1803 is configured to plot a route formed by connecting multiple position points in the electronic map in order of converted longitude coordinates from large to small or in order of the converted longitude coordinates from small to large.

In certain embodiment(s), referring to FIG. 19, the multiple position points include a starting point, an end point and way points between the starting point and the end point. The apparatus further includes:

a request response module 1807, configured to acquire, in response to a route plotting request based on the electronic map, a starting point and an end point corresponding to the route plotting request; and a coordinate determination module 1808, configured to determine coordinates of way points between the starting point and the end point according to coordinates of the starting point and coordinates of the end point, the coordinates including a longitude coordinate and a latitude coordinate.

In certain embodiment(s), referring to FIG. 19, the coordinate determination module 1808 includes:

a first determination unit 1818, configured to determine coordinates of at least one first way point between the starting point and the end point according to the coordinates of the starting point and the coordinates of the end point; and a second determination unit 1828, configured to determine, from the starting point, the end point and the at least one first way point, coordinates of at least one second way point between every two adjacent position points in parallel according to coordinates of every two adjacent position points.

In certain embodiment(s), referring to FIG. 19, the quantity of the first way points is a target quantity, and the apparatus further includes:

a coordinate difference determination module 1809, configured to determine, based on the target map region currently displayed in the electronic map, a maximum longitude coordinate difference and a maximum latitude coordinate difference of the target map region;

the coordinate difference determination module 1809 is further configured to determine a target longitude coordinate difference between the starting point and the end point, and a target latitude coordinate difference between the starting point and the end point; and a quantity determination module 18010, configured to determine, based on the maximum longitude coordinate difference, the maximum latitude coordinate difference, the target longitude coordinate difference and the target latitude coordinate difference, the target quantity.

In certain embodiment(s), referring to FIG. 19, the quantity determination module 18010 includes:

a ratio determination unit 18110, configured to determine a first ratio between the target longitude coordinate difference and the maximum longitude coordinate difference, and a second ratio between the target latitude coordinate difference and the maximum latitude coordinate difference; and a quantity determination unit 18210, configured to determine, based on the first ratio and the second ratio, the target quantity, the target quantity being positively correlated with the maximum value of the first ratio and the second ratio.

In certain embodiment(s), referring to FIG. 19, the operation of determining coordinates of at least one first way point between the starting point and the end point according to coordinates of the starting point and coordinates of the end point is executed by a central processing unit, and the operation of determining, from the starting point, the end point and the at least one first way point, coordinates of at least one second way point between every two adjacent position points in parallel according to coordinates of every two adjacent position points is executed by a graphics processing unit.

The apparatus further includes:

a coordinate storage module 18011, configured to store, by the central processing unit, the coordinates of the starting point, the coordinates of the end point and the coordinates of the at least one first way point in an internal memory buffer space; and a coordinate acquisition module 18012, configured to acquire, by the graphics processing unit, the coordinates of the starting point, the coordinates of the end point and the coordinates of the at least one first way point in the internal memory buffer space.

The route plotting apparatus provided by the embodiments is only illustrated with the division of the functional modules when plotting routes. In implementation, the functions may be allocated to and performed by different functional modules as desirable. That is, an internal structure of the computing device is divided into different functional modules to perform all or some of the functions described. In addition, the route plotting apparatus and route plotting method embodiments provided by the embodiments belong to the same conception. For details of a specific implementation process, refer to the method embodiments, which will not be repeated here.

The embodiments of the present disclosure further provide a computing device. The computing device includes a processor and a memory. The memory stores at least one computer program. The at least one computer program is loaded and executed by the processor to implement the operations performed in the route plotting method of the embodiments.

Figure 20:
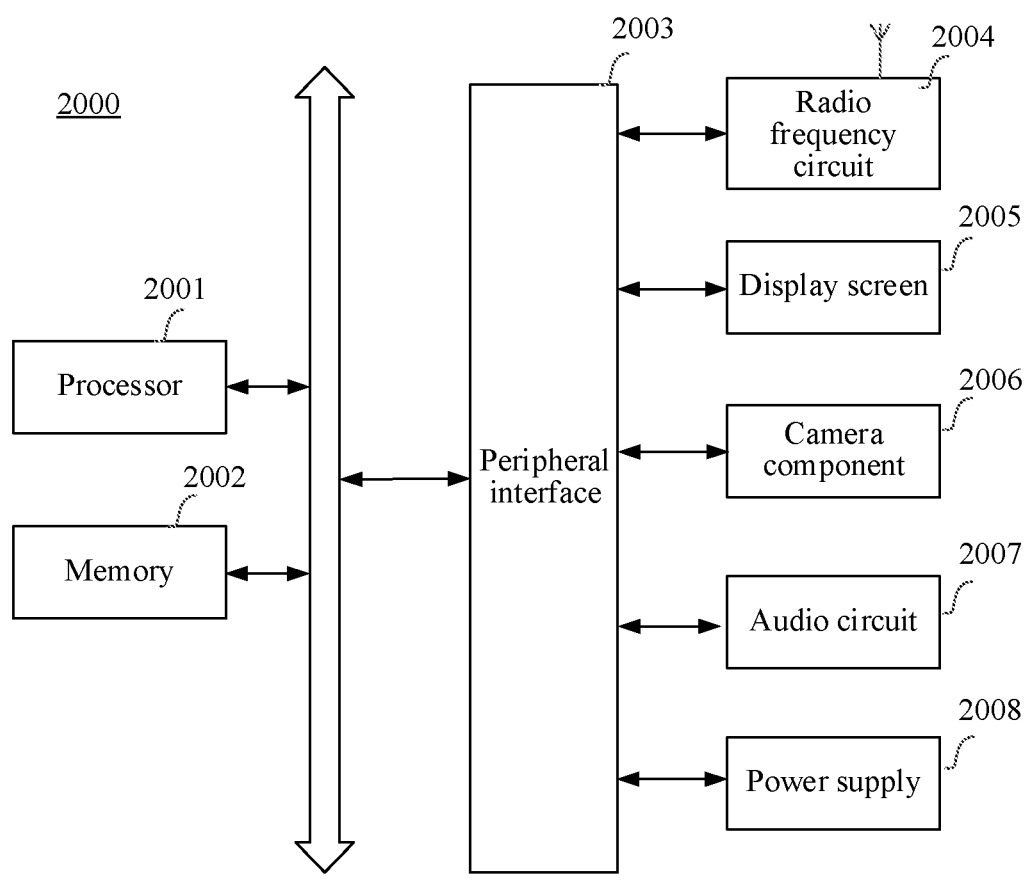
FIG. 20 is a schematic structural diagram of a terminal according to certain embodiment(s) of the present disclosure.

In certain embodiment(s), the computing device is provided as a terminal. FIG. 20 shows a schematic structural diagram of a terminal 2000 provided by an exemplary embodiment of the present disclosure.

The terminal 2000 includes: a processor 2001 and a memory 2002.

The processor 2001 may include one or more processing cores, for example, a 4-core processor or an 8-core processor. The processor 2001 may be implemented in at least one hardware form of digital signal processing (DSP), a field programmable gate array (FPGA) and a programmable logic array (PLA). The processor 2001 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 2001 may be integrated with a graphics processing unit (GPU, an interaction unit for graphics processing). The GPU is responsible for rendering and plotting content that may be displayed in a display screen. In some embodiments, the processor 2001 may further include an artificial intelligence (AI) processor. The AI processor is configured to process computing operations related to machine learning.

The memory 2002 may include one or more computer-readable storage media. The computer-readable storage medium may be non-transient. The memory 2002 may further include a high-speed random access memory and a nonvolatile memory, for example, one or more disk storage devices or flash storage devices. In some embodiments, a non-transient computer-readable storage medium in the memory 2002 is configured to store at least one computer program, and the at least one computer program is used by the processor 2001 to implement the route plotting method provided by the method embodiments of the present disclosure.

In some embodiments, the terminal 2000 may further include: a peripheral interface 2003 and at least one peripheral device. The processor 2001, the memory 2002 and the peripheral interface 2003 may be connected by a bus or a signal cable. Each peripheral device may be connected with the peripheral interface 2003 by a bus, a signal cable, or a circuit board. In certain embodiment(s), the peripheral device includes: at least one of a radio frequency circuit 2004, a display screen 2005, a camera component 2006, an audio circuit 2007 and a power supply 2008.

A person skilled in the art may understand that the structure shown in FIG. 20 does not constitute a limitation on the terminal 2000, and may include more or fewer components than shown, or combine certain components, or adopt different component arrangements.

The embodiments of the present disclosure further provide a computer-readable storage medium. The computer-readable storage medium stores at least one computer program. The at least one computer program is loaded and executed by a processor to perform the operations performed in the route plotting method of the embodiments.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit may be implemented using one or more processors (or processors and memory). Likewise, a processor (or processors and memory) may be used to implement one or more units. Moreover, each unit may be part of an overall unit that includes the functionalities of the unit.

The embodiments of the present disclosure further provide a computer program product, including a computer program. The computer program is loaded and executed by a processor to implement the operations performed in the route plotting method of the embodiments. In some embodiments, the computer program involved in the embodiments of the present disclosure may be deployed on a computing device for being executed, or executed on multiple computing devices located in one location, or executed on multiple computing devices distributed in multiple locations and interconnected via a communication network. The multiple computing devices distributed in the multiple locations and interconnected via the communication network may constitute a blockchain system.

What is claimed is:

1. A route plotting method, executed by a computing device, and the method comprising:
receiving a route plotting request associated with an electronic map;
acquiring, in response to the route plotting request, a starting point and an end point corresponding to the route plotting request;
determining multiple position points in the electronic map, the multiple position points including the starting point, the end point, and a plurality of way points between the starting point and the end point, the electronic map including a first longitude coordinate range and a target longitude coordinate range, and longitude coordinates of the multiple position points falling within the first longitude coordinate range,
wherein the determining the multiple position points comprises determining coordinates of the plurality of way points between the starting point and the end point according to coordinates of the starting point and coordinates of the end point, the coordinates each including a longitude coordinate and a latitude coordinate, and
wherein the determining the coordinates of the plurality way points comprises: determining coordinates of at least one first way point between the starting point and the end point according to the coordinates of the starting point and the coordinates of the end point; and determining, based on the starting point, the end point, and the at least one first way point, coordinates of at least one second way point between every two adjacent position points in parallel according to coordinates of every two adjacent position points, wherein the coordinates of the at least one second way point are determined in parallel at least in a graphics processing unit (GPU);
determining whether the multiple position points meet a conversion condition, the conversion condition including: an absolute value of a difference between longitude coordinates of adjacent position points is greater than a first value, the first value being a maximum value within the first longitude coordinate range; and the project longitude coordinate is a longitude coordinate in the longitude coordinates of the multiple position points that does not fall within the target longitude coordinate range;
converting a project longitude coordinate to the target longitude coordinate range in response to the multiple position points meeting the conversion condition; and
plotting, in order of converted longitude coordinates, a route formed by connecting the multiple position points in the electronic map.

2. The method according to claim 1, wherein the first longitude coordinate range includes a first sub-range and a second sub-range, the target longitude coordinate range includes the second sub-range and a third sub-range, and converting the project longitude coordinate comprises:
adding, in response to that a maximum value in the third sub-range is greater than a maximum value in the first sub-range, a second value to the project longitude coordinate; or,
subtracting, in response to that the maximum value in the third sub-range is less than the maximum value in the first sub-range, the second value from the project longitude coordinate;
wherein the second value is an absolute value of a difference between the maximum value in the third sub-range and the maximum value in the first sub-range.

3. The method according to claim 1, wherein converting the project longitude coordinate comprises:

determining, based on a target map region currently displayed in the electronic map, a second longitude coordinate range corresponding to the target map region, longitude coordinates within the second longitude coordinate range increasing in sequence;

for every two adjacent position points of the multiple position points, converting the project longitude coordinate in longitude coordinates of the two position points to the target longitude coordinate range in response to that the absolute value of the difference between the longitude coordinates of the two position points is greater than the first value; and converting the longitude coordinates of the two position points to the target longitude coordinate range in response to that the absolute value of the difference between the longitude coordinates of the two position points is not greater than the first value, and in response to that the longitude coordinates of the two position points do not fall within the target longitude coordinate range and do not fall within the second longitude coordinate range.

4. The method according to claim 3, wherein the first longitude coordinate range includes a first sub-range and a second sub-range, the target longitude coordinate range includes the second sub-range and a third sub-range, and converting the longitude coordinates comprises:

adding a second value to the longitude coordinates of the two position points in response to that a maximum value in the third sub-range is greater than a maximum value in the first sub-range, and in response to that the longitude coordinates of the two position points do not fall within the second sub-range and do not fall within the second longitude coordinate range; or, subtracting the second value from the longitude coordinates of the two position points in response to that the maximum value in the third sub-range is less than the maximum value in the first sub-range, and in response to that the longitude coordinates of the two position points do not fall within the second sub-range and do not fall within the second longitude coordinate range;

wherein the second value is an absolute value of a difference between the maximum value in the third sub-range and the maximum value in the first sub-range.

5. The method according to claim 1, wherein the first longitude coordinate range includes positive numbers and negative numbers, and the target longitude coordinate range excludes positive numbers or excludes negative numbers.

6. The method according to claim 5, further comprising:

determining, based on a target map region currently displayed in the electronic map, a longitude coordinate of a center point of the target map region, the longitude coordinate of the center point falling within the first longitude coordinate range;

determining a longitude coordinate range from 0° to 360° as the target longitude coordinate range in response to that the longitude coordinate of the center point is greater than 0°; and determining a longitude coordinate range from −360° to 0° as the target longitude coordinate range in response to that the longitude coordinate of the center point is not greater than 0°.

7. The method according to claim 1, further comprising:

changing, for each of the multiple position points, a latitude coordinate of the position point to a maximum latitude coordinate in response to that the latitude coordinate of the position point is greater than the maximum latitude coordinate of the electronic map; and changing, for each of the multiple position points, the latitude coordinate of the position point to a minimum latitude coordinate in response to that the latitude coordinate of the position point is less than the minimum latitude coordinate of the electronic map.

8. The method according to claim 1, wherein plotting the route comprises:

plotting a route formed by connecting the multiple position points in the electronic map in order of the converted longitude coordinates from large to small or in order of the converted longitude coordinates from small to large.

9. The method according to claim 1, wherein the quantity of the first way points is a target quantity, the method further comprises:

determining, based on the target map region currently displayed in the electronic map, a maximum longitude coordinate difference and a maximum latitude coordinate difference of the target map region;

determining a target longitude coordinate difference between the starting point and the end point, and a target latitude coordinate difference between the starting point and the end point; and determining, based on the maximum longitude coordinate difference, the maximum latitude coordinate difference, the target longitude coordinate difference and the target latitude coordinate difference, the target quantity.

10. A route plotting apparatus, the apparatus comprising: a memory storing computer program instructions; and a processor coupled to the memory and based on the computer program instructions, the processor being configured to:

receive a route plotting request associated with an electronic map;

acquire, in response to the route plotting request, a starting point and an end point corresponding to the route plotting request;

determine multiple position points in the electronic map, the multiple position points including the starting point, the end point, and a plurality of way points between the starting point and the end point, the electronic map including a first longitude coordinate range and a target longitude coordinate range, and longitude coordinates of the multiple position points falling within the first longitude coordinate range, wherein the determine the multiple position points comprises determining coordinates of the plurality of way points between the starting point and the end point according to coordinates of the starting point and coordinates of the end point, the coordinates each including a longitude coordinate and a latitude coordinate, and wherein the determining the coordinates of the plurality way points comprises: determining coordinates of at least one first way point between the starting point and the end point according to the coordinates of the starting point and the coordinates of the end point; and determining, based on the starting point, the end point, and the at least one first way point, coordinates of at least one second way point between every two adjacent position points in parallel according to coordinates of every two adjacent position points, wherein the coordinates of the at least one second way point are determined in parallel at least in a graphics processing unit (GPU);

determine whether the multiple position points meet a conversion condition, the conversion condition including: an absolute value of a difference between longitude coordinates of adjacent position points is greater than a first value, the first value being a maximum value within the first longitude coordinate range; and the project longitude coordinate is a longitude coordinate in the longitude coordinates of the multiple position points that does not fall within the target longitude coordinate range;

convert a project longitude coordinate to the target longitude coordinate range in response to the multiple position points meeting the conversion condition; and plot, in order of converted longitude coordinates, a route formed by connecting the multiple position points in the electronic map.

11. The apparatus according to claim 10, wherein the first longitude coordinate range includes a first sub-range and a second sub-range, the target longitude coordinate range includes the second sub-range and a third sub-range, and converting the project longitude coordinate includes:

adding, in response to that a maximum value in the third sub-range is greater than a maximum value in the first sub-range, a second value to the project longitude coordinate; or, subtracting, in response to that the maximum value in the third sub-range is less than the maximum value in the first sub-range, the second value from the project longitude coordinate;

wherein the second value is an absolute value of a difference between the maximum value in the third sub-range and the maximum value in the first sub-range.

12. The apparatus according to claim 10, wherein converting the project longitude coordinate includes:

determining, based on a target map region currently displayed in the electronic map, a second longitude coordinate range corresponding to the target map region, longitude coordinates within the second longitude coordinate range increasing in sequence;

for every two adjacent position points of the multiple position points, converting the project longitude coordinate in longitude coordinates of the two position points to the target longitude coordinate range in response to that the absolute value of the difference between the longitude coordinates of the two position points is greater than the first value; and converting the longitude coordinates of the two position points to the target longitude coordinate range in response to that the absolute value of the difference between the longitude coordinates of the two position points is not greater than the first value, and in response to that the longitude coordinates of the two position points do not fall within the target longitude coordinate range and do not fall within the second longitude coordinate range.

13. The apparatus according to claim 10, wherein the first longitude coordinate range includes a first sub-range and a second sub-range, the target longitude coordinate range includes the second sub-range and a third sub-range, and converting the longitude coordinates includes:

adding a second value to the longitude coordinates of the two position points in response to that a maximum value in the third sub-range is greater than a maximum value in the first sub-range, and in response to that the longitude coordinates of the two position points do not fall within the second sub-range and do not fall within the second longitude coordinate range; or, subtracting the second value from the longitude coordinates of the two position points in response to that the maximum value in the third sub-range is less than the maximum value in the first sub-range, and in response to that the longitude coordinates of the two position points do not fall within the second sub-range and do not fall within the second longitude coordinate range;

wherein the second value is an absolute value of a difference between the maximum value in the third sub-range and the maximum value in the first sub-range.

14. The apparatus according to claim 10, wherein the first longitude coordinate range includes positive numbers and negative numbers, and the target longitude coordinate range excludes positive numbers or excludes negative numbers.

15. The apparatus according to claim 10, wherein the processor is further configured to:

change, for each of the multiple position points, a latitude coordinate of the position point to a maximum latitude coordinate in response to that the latitude coordinate of the position point is greater than the maximum latitude coordinate of the electronic map; and change, for each of the multiple position points, the latitude coordinate of the position point to a minimum latitude coordinate in response to that the latitude coordinate of the position point is less than the minimum latitude coordinate of the electronic map.

16. The apparatus according to claim 10, wherein plotting the route includes:

plotting a route formed by connecting the multiple position points in the electronic map in order of the converted longitude coordinates from large to small or in order of the converted longitude coordinates from small to large.

17. A non-transitory computer-readable storage medium storing computer program instructions executable by at least one processor to perform operations comprising:

receiving a route plotting request associated with an electronic map;

acquiring, in response to the route plotting request, a starting point and an end point corresponding to the route plotting request;

determining multiple position points in the electronic map, the multiple position points including the starting point, the end point, and a plurality of way points between the starting point and the end point, the electronic map including a first longitude coordinate range and a target longitude coordinate range, and longitude coordinates of the multiple position points falling within the first longitude coordinate range, wherein the determining the multiple position points comprises determining coordinates of the plurality of way points between the starting point and the end point according to coordinates of the starting point and coordinates of the end point, the coordinates each including a longitude coordinate and a latitude coordinate, and wherein the determining the coordinates of the plurality way points comprises: determining coordinates of at least one first way point between the starting point and the end point according to the coordinates of the starting point and the coordinates of the end point; and determining, based on the starting point, the end point, and the at least one first way point, coordinates of at least one second way point between every two adjacent position points in parallel according to coordinates of every two adjacent position points, wherein the coordinates of the at least one second way point are determined in parallel at least in a graphics processing unit (GPU);

determining whether the multiple position points meet a conversion condition, the conversion condition including: an absolute value of a difference between longitude coordinates of adjacent position points is greater than a first value, the first value being a maximum value within the first longitude coordinate range; and the project longitude coordinate is a longitude coordinate in the longitude coordinates of the multiple position points that does not fall within the target longitude coordinate range;

converting a project longitude coordinate to the target longitude coordinate range in response to the multiple position points meeting the conversion condition; and plotting, in order of converted longitude coordinates, a route formed by connecting the multiple position points in the electronic map.

\* \* \* \* \*